US010326936B2

(12) United States Patent
Jeon et al.

(10) Patent No.: US 10,326,936 B2
(45) Date of Patent: Jun. 18, 2019

(54) METHOD FOR PROVIDING IMAGES AND ELECTRONIC DEVICE SUPPORTING THE SAME

(71) Applicant: Samsung Electronics Co., Ltd., Suwon-si, Gyeonggi-do (KR)

(72) Inventors: Hoseong Jeon, Suwon-si (KR); Seungwoo Lee, Yongin-si (KR); Woohyun Baek, Suwon-si (KR); Kihuk Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 31 days.

(21) Appl. No.: 15/226,382

(22) Filed: Aug. 2, 2016

(65) Prior Publication Data
US 2017/0048458 A1     Feb. 16, 2017

(30) Foreign Application Priority Data
Aug. 12, 2015   (KR) .................. 10-2015-0113594

(51) Int. Cl.
*H04N 5/232*     (2006.01)

(52) U.S. Cl.
CPC ..... *H04N 5/23267* (2013.01); *H04N 5/23254* (2013.01); *H04N 5/23293* (2013.01)

(58) Field of Classification Search
CPC ........... H04N 5/23248; H04N 5/23251; H04N 5/23254; H04N 5/23258
USPC ....................... 348/208.99–208.2
See application file for complete search history.

(56) References Cited

U.S. PATENT DOCUMENTS

| 8,248,480 B2* | 8/2012 | Matsunaga | H04N 5/272 348/208.99 |
| 2007/0242142 A1* | 10/2007 | Okazaki | G03B 13/18 348/239 |
| 2009/0147107 A1* | 6/2009 | Kawahara | G03B 3/10 348/240.2 |
| 2010/0061657 A1* | 3/2010 | Chien | H04N 5/23219 382/276 |
| 2012/0242849 A1* | 9/2012 | Herz | H04N 5/23222 348/208.99 |
| 2013/0063614 A1* | 3/2013 | Tsutsumi | H04N 5/2258 348/208.4 |
| 2013/0208165 A1 | 8/2013 | An et al. | |
| 2013/0215291 A1 | 8/2013 | Baek et al. | |
| 2013/0215295 A1 | 8/2013 | Baek et al. | |

(Continued)

FOREIGN PATENT DOCUMENTS

| JP | 2008-206111 | 9/2008 |
| JP | 5693664 B2 | 9/2013 |

(Continued)

*Primary Examiner* — Anthony J Daniels
(74) *Attorney, Agent, or Firm* — Jefferson IP Law, LLP

(57) ABSTRACT

An apparatus and a method for providing images are provided. The apparatus includes an electronic device that may have a camera, and a processor configured to obtain an image that contains a plurality of objects by using the camera, display the image through a display that is functionally connected to the processor, select a partial area of the image, which includes at least a portion of at least one of the plurality of objects, based on the sizes, movements, or positions of the plurality of objects, and stabilize the image based on the selected partial area.

14 Claims, 24 Drawing Sheets

(56) References Cited

U.S. PATENT DOCUMENTS

2013/0251273 A1\* 9/2013 Westphal ............. G06K 9/6201
382/218
2014/0078321 A1\* 3/2014 Hong ...................... G06T 5/003
348/208.1

FOREIGN PATENT DOCUMENTS

| KR | 10-2013-0094113 A | 8/2013 |
| KR | 10-2013-0094633 A | 8/2013 |
| KR | 10-2013-0094661 A | 8/2013 |

\* cited by examiner

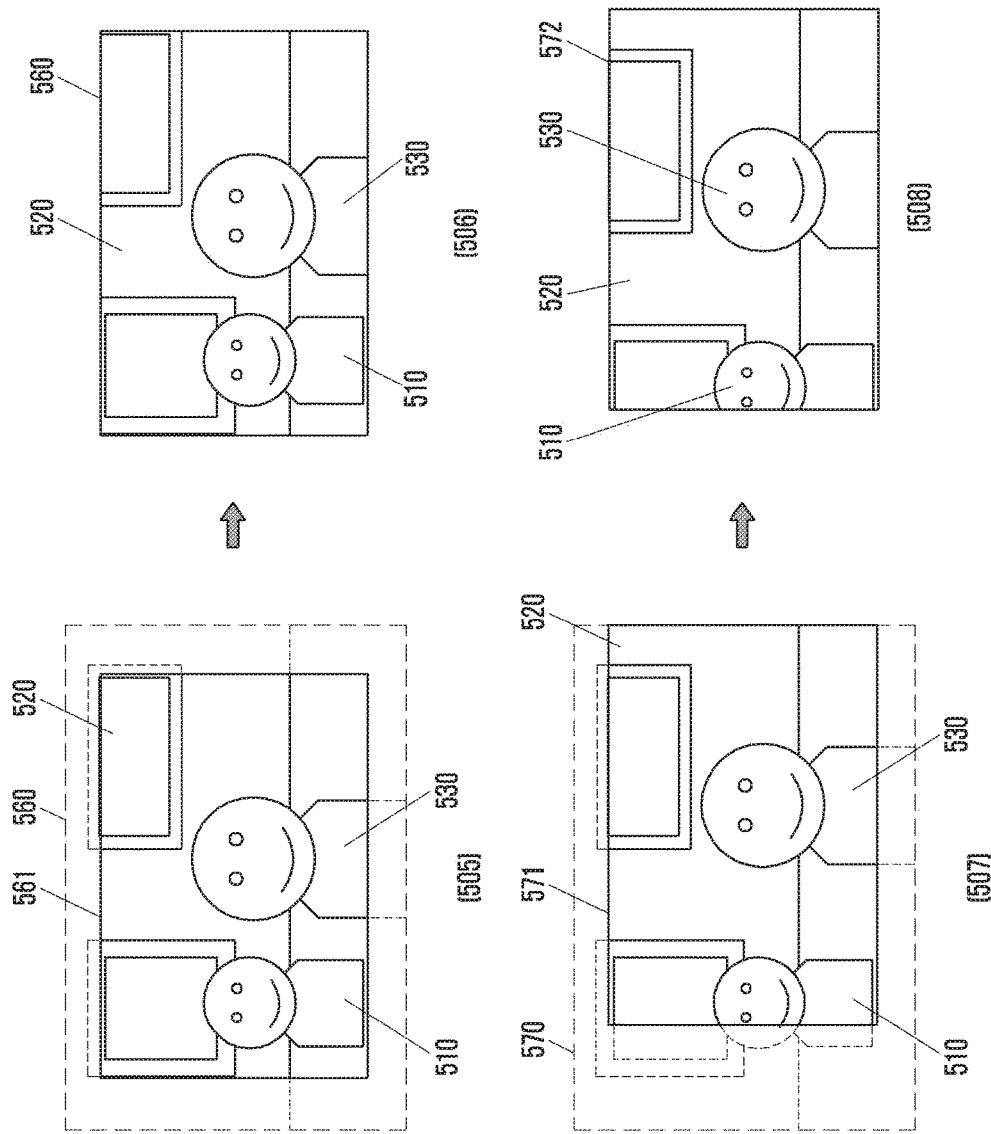

FIG. 6
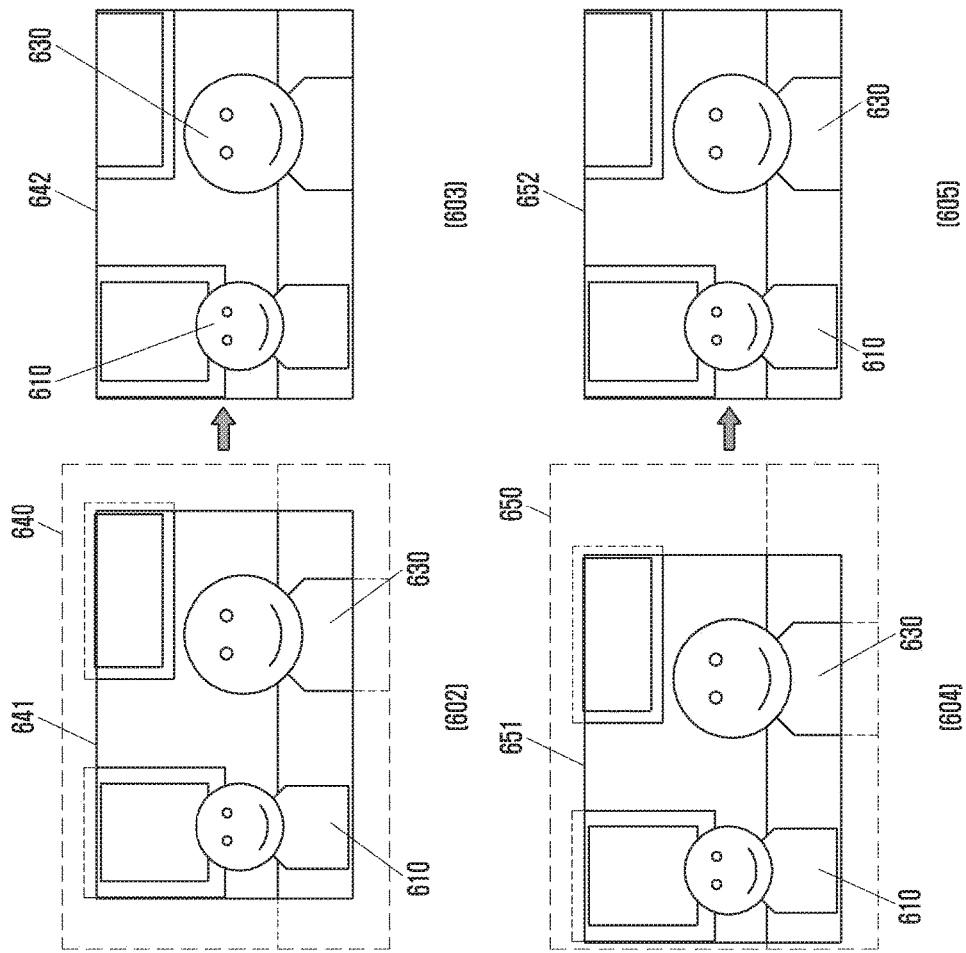
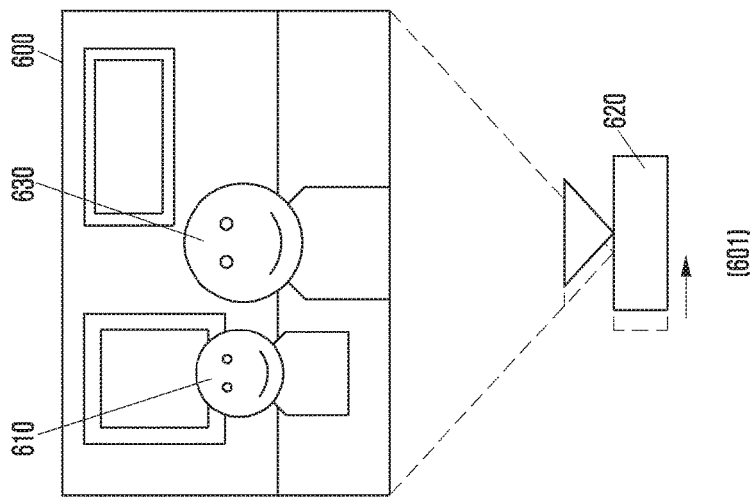

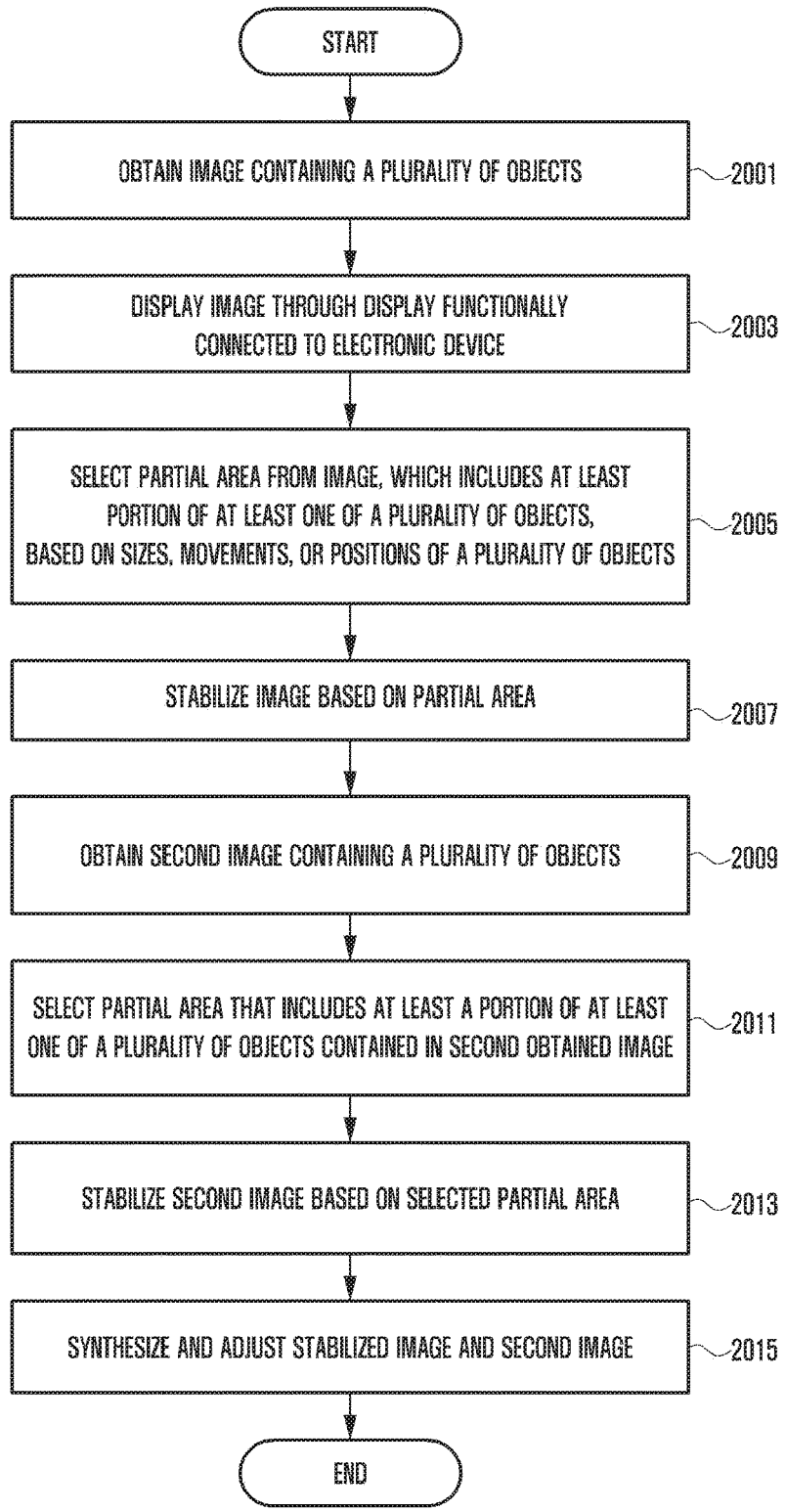

METHOD FOR PROVIDING IMAGES AND ELECTRONIC DEVICE SUPPORTING THE SAME

CROSS-REFERENCE TO RELATED APPLICATION(S)

This application claims the benefit under 35 U.S.C. § 119(a) of a Korean patent application filed on Aug. 12, 2015 in the Korean Intellectual Property Office and assigned Serial number 10-2015-0113594, the entire disclosure of which is hereby incorporated by reference.

TECHNICAL FIELD

The present disclosure relates to a method for adjusting images and an electronic device for providing the same. More particularly, the present disclosure is directed to a method for adjusting images by configuring a partial area of an image to be a weight area, and to an electronic device for providing the same.

BACKGROUND

A camera device may include an image sensor for transferring electrical signals, a printed circuit board on which the image sensor is mounted, an infrared block filter for blocking an infrared light for the image sensor, and one or more lenses to deliver images to the image sensor. Further, an actuator module to perform an auto focusing function and an image stabilization function may also be installed in the optical system.

In addition, with the recent development of technology, camera devices have adopted various functions in order to effectively execute still image functions and/or moving image functions. For example, in the case of photographing a moving image, a camera device may calculate a movement vector between frames constituting the moving image, and compensate for the corresponding movement vector on the assumption that the movement vector corresponds to a camera shake caused by a user in order to thereby perform a compensation function by using a margin area of the image.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method for adjusting images and an electronic device for providing the same. In an image adjusting method based on the vector for the movement of a feature point in the frame of the image, when the subject (e.g., a person) moves in the image, the camera device may not be able to distinguish between the movement of the camera device and the movement of the subject. Thus, the camera device may perform an unnecessary correction because the camera device cannot distinguish between the movement of the camera device and the movement of the subject. For example, the camera device may recognize the movement of the subject as a hand tremor in order to thereby correct the image, or may recognize the intentional movement (e.g., panning) of the camera device as a hand tremor in order to thereby correct the image. Thus, this may result in a distortion of the image.

The embodiments described below provide a method for adjusting images and an electronic device for supporting the same in order to address the problems above.

In accordance with an aspect of the present disclosure, a method is provided. The method may include obtaining or collecting an image that includes a plurality of objects, displaying the image through a display that is functionally connected to the electronic device, selecting a partial area of the image, which includes a portion of at least one of the plurality of objects, based on the sizes, movements, or positions of the plurality of objects, and stabilizing the image based on the selected partial area, and further provides an electronic device supporting the method.

In accordance with another aspect of the present disclosure, a method is provided. The method may include obtaining or collecting an image that includes a plurality of objects, displaying the image through a display that is functionally connected to the electronic device, selecting a partial area from the image, which includes at least a portion of at least one of the plurality of objects, based on the sizes, movements, or positions of the plurality of objects, stabilizing the image based on the partial area, determining whether or not the position of at least one of the image or the electronic device is changed while the stabilized image is displayed, and determining whether or not to re-designate the partial area based on the determination result of the change. An electronic device supporting this method is also provided.

In accordance with an aspect of the present disclosure, a method is provided. The method may include obtaining or collecting an image that includes a plurality of objects, displaying the image through a display that is functionally connected to the electronic device, selecting a partial area from the image, which includes a portion of at least one of the plurality of objects, based on the sizes, movements, or positions of the plurality of objects, stabilizing the image based on the partial area, obtaining a secondary image that includes a plurality of objects by using a camera, selecting a partial area that includes a portion of at least one of the plurality of objects that are included in the obtained image, stabilizing the secondary image based on the select partial area, and synthesizing and adjusting the secondary image and the stabilized image.

According to an embodiment of the disclosure, a partial area of a displayed image may be configured automatically by the electronic device or selectively by a user input in order to thereby execute the stabilization of the image and in order to thereby improve the convenience to the user.

According to an embodiment of the present disclosure, when a predetermined condition is satisfied while displaying an image based on the initially configured partial area, the initially configured partial area may be automatically changed to a new partial area, in order to thereby execute the stabilization of the image and in order to thereby improve the convenience to the user.

According to an embodiment of the present disclosure, partial areas, which are configured in a plurality of images, may be synthesized and adjusted in order to thereby secure the stabilization of the image and in order to thereby improve accessibility by the user.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other objects, features, and advantages of certain embodiments of the present disclosure will be more apparent from the following description in conjunction with the accompanying drawings, in which:

FIGS. 5A, 5B, and 5C illustrate the adjustment of an image, according to various embodiments of the present disclosure;

FIG. 6 illustrates the adjustment of an image to correspond to the movement of an imaging device, according to various embodiments of the present disclosure;

FIG. 20 is a flowchart for synthesizing partial areas included in a plurality of images, according to various embodiments of the present disclosure.

Throughout the drawings, like reference numerals will be understood to refer to like parts, components, and structures.

DETAILED DESCRIPTION

Figure 1:
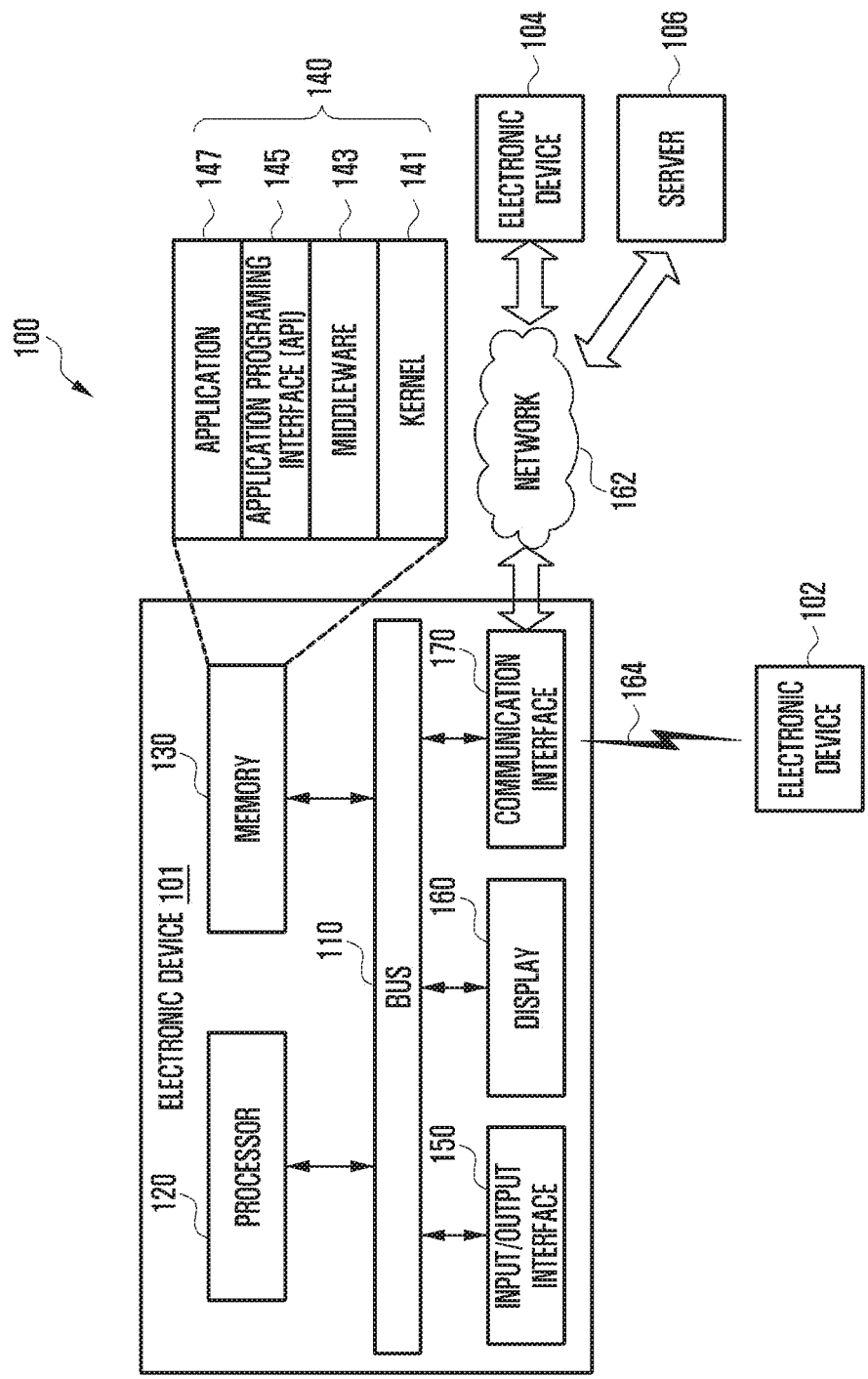
FIG. 1 is a block diagram illustrating a network environment, according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as mere examples. Accordingly, those of ordinary skill in the art will recognize that various changes and modifications of the various embodiments described herein can be made without departing from the scope and spirit of the present disclosure. In addition, descriptions of well-known functions and implementations may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a", "an", and "the" include plural referents unless the content clearly indicates otherwise. Thus, for example, reference to "a component surface" includes reference to one or more of such surfaces.

"Or" means "and/or". As used herein, the term "and/or" includes any and all combinations of one or more of the associated listed items. It will be further understood that the terms "comprises" and/or "comprising", or "includes" and/or "including" when used in this specification, specify the presence of stated features, regions, integers, operations, elements, and/or components, but do not preclude the presence or addition of one or more other features, regions, integers, operations, elements, components, and/or groups thereof.

It will be understood that, although the terms "first", "second", "third", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element", "component", "region", "layer" or "section" discussed below could be termed a second element, component, region, layer or section without departing from the teachings herein.

In this disclosure, an electronic device may be a device that involves a communication function. For example, an electronic device may be a smart phone, a tablet personal computer (PC), a mobile phone, a video phone, an e-book reader, a desktop PC, a laptop PC, a netbook computer, a personal digital assistant (PDA), a portable multimedia player (PMP), a Moving Picture Experts Group (MPEG-1 or MPEG-2) audio layer 3 (MP3) player, a portable medical device, a digital camera, or a wearable device (e.g., a head-mounted device (HMD) such as electronic glasses, electronic clothes, an electronic bracelet, an electronic necklace, an electronic appcessory, or a smart watch).

According to some embodiments of the present disclosure, an electronic device may be a smart home appliance that involves a communication function. For example, an electronic device may be a television (TV), a digital versatile disc (DVD) player, audio equipment, a refrigerator, an air conditioner, a vacuum cleaner, an oven, a microwave, a washing machine, an air cleaner, a set-top box, a TV box (e.g., Samsung HomeSync™, Apple TV™, Google TV, etc.), a game console, an electronic dictionary, an electronic key, a camcorder, or an electronic picture frame.

According to some embodiments of the present disclosure, an electronic device may be a medical device (e.g., magnetic resonance angiography (MRA), magnetic resonance imaging (MRI), computed tomography (CT), ultrasonography, etc.), a navigation device, a global positioning system (GPS) receiver, an event data recorder (EDR), an flight data recorder (FDR), a car infotainment device, electronic equipment for ship (e.g., a marine navigation system, a gyrocompass, etc.), avionics, security equipment, or an industrial or home robot.

According to some embodiments of the present disclosure, an electronic device may be furniture or part of a building or construction having a communication function, an electronic board, an electronic signature receiving device, a projector, or various measuring instruments (e.g., a water meter, an electric meter, a gas meter, a wave meter, etc.). An electronic device disclosed herein may be one of the above-mentioned devices or any combination thereof. As well understood by those skilled in the art, the above-mentioned electronic devices are examples only and not to be considered as a limitation of this disclosure.

FIG. 1 is a block diagram illustrating a network environment 100 including therein an electronic device 101 in accordance with an embodiment of the present disclosure.

Referring to FIG. 1, the electronic device 101 may include, but not limited to, a bus 110, a processor 120, a memory 130, an input/output interface 150, a display 160, a communication interface 170, and an application control module 140.

The bus 110 may be a circuit designed for connecting the above-discussed elements and communicating data (e.g., a control message) between such elements.

The processor 120 may receive commands from the other elements (e.g., the memory 130, the input/output interface 150, the display 160, the communication interface 170, or the application control module 140, etc.) through the bus 110, interpret the received commands, and perform the arithmetic or data processing based on the interpreted commands.

The memory 130 may store therein commands or data received from or created at the processor 120 or other elements (e.g., the input/output interface 150, the display 160, the communication interface 170, or the application control module 140, etc.). The memory 130 may include programming modules such as a kernel 141, a middleware 143, an application programming interface (API) 145, and an application 147. Each of the programming modules may be implemented in software, firmware, hardware, and any combination thereof.

The kernel 141 may control or manage system resources (e.g., the bus 110, the processor 120, or the memory 130, etc.) used for performing operations or functions of the other programming modules, e.g., the middleware 143, the API 145, or the application 147. Additionally, the kernel 141 may offer an interface that allows the middleware 143, the API 145 or the application 147 to access, control or manage individual elements of the electronic device 101.

The middleware 143 may perform intermediation by which the API 145 or the application 147 communicates with the kernel 141 to transmit or receive data. Additionally, in connection with task requests received from the applications 147, the middleware 143 may perform a control (e.g., scheduling or load balancing) for the task request by using technique such as assigning the priority for using a system resource of the electronic device 101 (e.g., the bus 110, the processor 120, or the memory 130, etc.) to at least one of the applications 147.

The API 145 which is an interface for allowing the application 147 to control a function provided by the kernel 141 or the middleware 143 may include, for example, at least one interface or function (e.g., a command) for a file control, a window control, an image processing, a text control, and the like.

According to embodiments of the present disclosure, the application 147 may include a short message service (SMS)/multimedia message service (MMS) application, an email application, a calendar application, an alarm application, a health care application (e.g., an application for measuring quantity of motion or blood sugar), an environment information application (e.g., an application for offering information about atmospheric pressure, humidity, or temperature, etc.), and the like. Additionally or alternatively, the application 147 may be an application associated with an exchange of information between the electronic device 101 and any external electronic device (e.g., an external electronic device 104). This type application may include a notification relay application for delivering specific information to an external electronic device, or a device management application for managing an external electronic device.

For example, the notification relay application may include a function to deliver notification information created at any other application of the electronic device 101 (e.g., the SMS/MMS application, the email application, the health care application, or the environment information application, etc.) to an external electronic device (e.g., the electronic device 104). Additionally or alternatively, the notification relay application may receive notification information from an external electronic device (e.g., the electronic device 104) and offer it to a user. The device management application may manage (e.g., install, remove or update) a certain function (a turn-on/turn-off of an external electronic device (or some components thereof), or an adjustment of brightness (or resolution) of a display) of any external electronic device (e.g., the electronic device 104) communicating with the electronic device 101, a certain application operating at such an external electronic device, or a certain service (e.g., a call service or a message service) offered by such an external electronic device.

According to embodiments of the present disclosure, the application 147 may include a specific application specified depending on attributes (e.g., a type) of an external electronic device (e.g., the electronic device 104). For example, in case an external electronic device is an MP3 player, the application 147 may include a specific application associated with a play of music. Similarly, in case an external electronic device is a portable medical device, the application 147 may include a specific application associated with a health care. In an embodiment of the present disclosure, the application 147 may include at least one of an application assigned to the electronic device 101 or an application received from an external electronic device (e.g., the server 106 or the electronic device 104).

The input/output interface 150 may deliver commands or data, entered by a user through an input/output unit (e.g., a sensor, a keyboard, or a touch screen), to the processor 120, the memory 130, the communication interface 170, or the application control module 140 via the bus 110. For example, the input/output interface 150 may offer data about a user's touch, entered through the touch screen, to the processor 120. Also, through the input/output unit (e.g., a speaker or a display), the input/output interface 150 may output commands or data, received from the processor 120, the memory 130, the communication interface 170, or the application control module 140 via the bus 110. For example, the input/output interface 150 may output voice data, processed through the processor 120, to a user through the speaker.

The display 160 may contain liquid crystal display (LCD), light emitting diode (LED), organic LED (OLED), microelectromechanical systems (MEMS) Display, and electronic paper display. The display 160 may display thereon various kinds of information (e.g., multimedia data, text data, etc.) to a user. The display 160 may contain touch screen and, for example, the display 160 may receive touch using electronic pen or a portion of the user's body, gesture, and hovering input.

In various embodiments of the present disclosure, the display 160 may output location information determined by at least one of the processor 120, the application processor (AP) 210, and the global navigation satellite system (GNSS) or global positioning system (GPS) module 227. The display 160 may also output information received by the electronic device 101 from one or more satellites. The display 160 may output a user input (UI) screen for setting the location identification period, generate an input signal corresponding to user input for setting the location identification period, and forward the input signal to at least one of the processor 120, the AP 210 and the GNSS module 227.

The communication interface 170 may perform a communication between the electronic device 101 and any external electronic device (e.g., the electronic device 104 of the server 106). For example, the communication interface 170 may communicate with any external device by being connected with a network 162 through a wired or wireless communication. A wireless communication 164 to an electronic device 102 for example may include, but not limited to, at least one of WiFi, Bluetooth (BT), near field communication (NFC), GPS, or a cellular communication (e.g., longterm evolution (LTE), LTE-advanced (LTE-A), code division multiple access (CDMA), wideband-CDMA (WCDMA), universal mobile telecommunication system (UMTS), wireless broadband (WiBro), or global system for mobile communication (GSM), etc.). A wired communication may include, but not limited to, at least one of universal serial bus (USB), high definition multimedia interface (HDMI), recommended standard 232 (RS-232)), or plain old telephone service (POTS).

According to an embodiment of the present disclosure, the network 162 may be a communication network, which may include at least one of a computer network, an internet, an internet of things, or a telephone network. According to an embodiment of the present disclosure, a protocol (e.g., transport layer protocol, data link layer protocol, or physical layer protocol) for a communication between the electronic device 101 and any external device may be supported by at least one of the application 147, the API 145, the middleware 143, the kernel 141, or the communication interface 170.

The application control module 140 may process at least part of information obtained from the other elements (e.g., the processor 120, the memory 130, the input/output interface 150, or the communication interface 170, etc.) and then offer it to a user in various ways. For example, the application control module 140 may recognize information about access components equipped in the electronic device 101, store such information in the memory 130, and execute the application 147 on the basis of such information. A further description about the application control module 140 will be given hereinafter through FIGS. 2 to 9.

Figure 2:
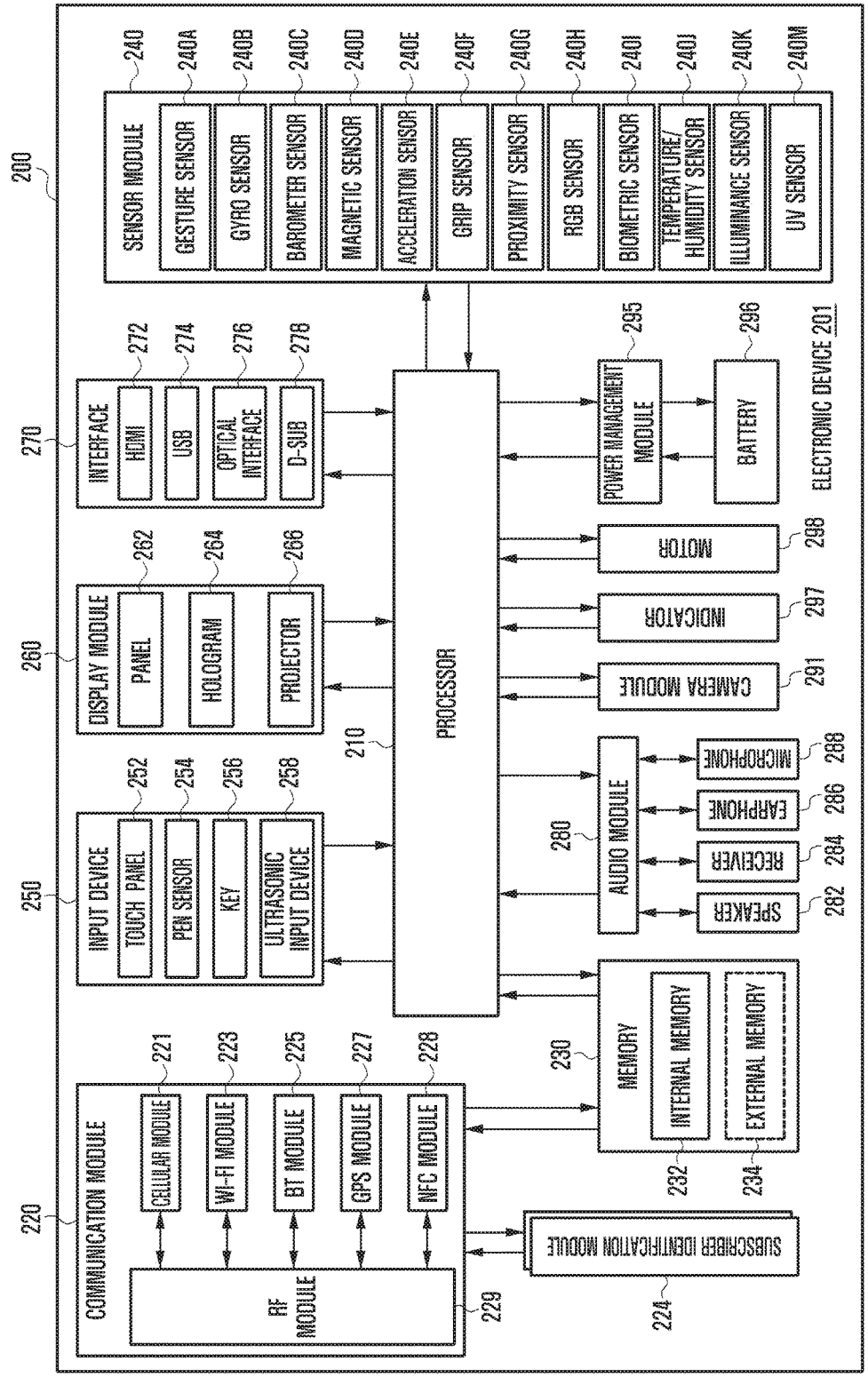
FIG. 2 is a block diagram of an electronic device, according to various embodiments of the present disclosure.

FIG. 2 is a block diagram illustrating an electronic device 201 in accordance with an embodiment of the present disclosure. The electronic device 201 may form, for example, the whole or part of the electronic device 101 shown in FIG. 1. Referring to FIG. 2, the electronic device 201 may include at least one AP 210, a communication module 220, a subscriber identification module (SIM) card 224, a memory 230, a sensor module 240, an input unit 250, a display or display module 260, an interface 270, an audio module 280, a camera module 291, a power management module 295, a battery 296, an indicator 297, and a motor 298.

The AP 210 may drive an operating system (OS) or applications, control a plurality of hardware or software components connected thereto, and also perform processing and operation for various data including multimedia data. The AP 210 may be formed of system-on-chip (SoC), for example. According to an embodiment of the present disclosure, the AP 210 may further include a graphic processing unit (GPU) (not shown).

The communication module 220 (e.g., the communication interface 170) may perform a data communication with any other electronic device (e.g., the electronic device 104 or the server 106) connected to the electronic device 201 (e.g., the electronic device 101 in FIG. 1) through the network. According to an embodiment of the present disclosure, the communication module 220 may include therein a cellular module 221, a Wi-Fi module 223, a BT module 225, a GPS (or GNSS) module 227, an NFC module 228, and a radio frequency (RF) module 229.

The cellular module 221 may offer a voice call, a video call, a message service, an internet service, or the like through a communication network (e.g., LTE, LTE-A, CDMA, WCDMA, UMTS, WiBro, or GSM, etc.). Additionally, the cellular module 221 may perform identification and authentication of the electronic device in the communication network, using the SIM card 224. According to an embodiment of the present disclosure, the cellular module 221 may perform at least part of functions the AP 210 can provide. For example, the cellular module 221 may perform at least part of a multimedia control function.

According to an embodiment of the present disclosure, the cellular module 221 may include a communication processor (CP) (not shown). Additionally, the cellular module 221 may be formed of SoC, for example. Although some elements such as the cellular module 221 (e.g., the CP), the memory 230, or the power management module 295 are shown as separate elements being different from the AP 210 in FIG. 2, the AP 210 may be formed to have at least part (e.g., the cellular module 221) of the above elements in an embodiment.

According to an embodiment of the present disclosure, the AP 210 or the cellular module 221 (e.g., the CP) may load commands or data, received from a nonvolatile memory connected thereto or from at least one of the other elements, into a volatile memory to process them. Additionally, the AP 210 or the cellular module 221 may store data, received from or created at one or more of the other elements, in the nonvolatile memory.

Each of the WiFi module 223, the BT module 225, the GPS (or GNSS) module 227 and the NFC module 228 may include a processor for processing data transmitted or received therethrough. Although FIG. 2 shows the cellular module 221, the WiFi module 223, the BT module 225, the GPS (or GNSS) module 227 and the NFC module 228 as different blocks, at least part of them may be contained in a single IC (Integrated Circuit) chip or a single IC package in an embodiment. For example, at least part (e.g., the CP corresponding to the cellular module 221 and a WiFi processor corresponding to the WiFi module 223) of respective processors corresponding to the cellular module 221, the WiFi module 223, the BT module 225, the GPS (or GNSS) module 227 and the NFC module 228 may be formed as a single SoC.

The RF module 229 may transmit and receive data, e.g., RF signals or any other electric signals. Although not shown, the RF module 229 may include a transceiver, a power amp module (PAM), a frequency filter, a low noise amplifier (LNA), or the like. Also, the RF module 229 may include any component, e.g., a wire or a conductor, for transmission of electromagnetic waves in a free air space. Although FIG. 2 shows that the cellular module 221, the WiFi module 223, the BT module 225, the GPS module 227 and the NFC module 228 share the RF module 229, at least one of them may perform transmission and reception of RF signals through a separate RF module in an embodiment of the present disclosure.

In one embodiment of the present disclosure, the communication module 220 may be connected to the AP. At least one of the cellular module 221, Wi-Fi module 223, Bluetooth module 225, GNSS module 227, and NFC module 228 may directly send and receive a signal to and from the AP.

In one embodiment of the present disclosure, the GNSS module 227 may be a module that has a location identification function enabling determination of the location of the electronic device 101. Hence, The GNSS module 227 may include one or more components to carry out the location identification function in addition to the components described herein.

In one embodiment of the present disclosure, the GNSS module 227 may include a controller for controlling components of the GNSS module 227 to carry out the GNSS related function. For example, the GNSS module 227 may include a GNSS engine (e.g. GPS engine). The GNSS module 227 may include a communication processor (CP), and the GNSS engine may be included in the communication processor. In various embodiments of the present disclosure, the GNSS module 227 may be implemented using a GNSS chipset (e.g. GPS chipset). The GNSS module 227, GNSS engine, controller in the GNSS module 227, GNSS chipset, and communication processor may be configured as separate entities with different functions or configured as a single entity, if desired.

In various embodiments of the present disclosure, the GNSS module 227 may receive information from one or more artificial satellites and forward the received information to the processor 120, the application processor (AP) 210, or the communication processor (not shown). The GNSS module 227 may directly identify the location of the electronic device 101 on the basis of the received satellite information. In this case, the GNSS module 227 may send information associated with the identified location to the processor 120, the AP 210, or the communication processor.

In various embodiments of the present disclosure, when at least a part of the GNSS module 227 (e.g. GNSS RF receiver 229A) is turned off, the electronic device 101 may identify the location by use of the communication module 220. When the GNSS RF receiver 229A is turned off, if there is a need to identify the location of the electronic device 101, the processor 120 may identify the location on the basis of the communication module 220 including the cellular module 221 and Wi-Fi module 223.

The SIM card 224_1 to 224_N may be a specific card formed of SIM and may be inserted into a slot 225_1 to 225_N formed at a certain place of the electronic device. The SIM card 224_1 to 224_N may contain therein an integrated circuit card identifier (ICCID) or an international mobile subscriber identity (IMSI).

The memory 230 (e.g., the memory 130) may include an internal memory 232 and an external memory 234. The internal memory 232 may include, for example, at least one of a volatile memory (e.g., dynamic random access memory (DRAM), static RAM (SRAM), synchronous DRAM (SDRAM), etc.) or a nonvolatile memory (e.g., one time programmable read-only memory (OTPROM), PROM, erasable and programmable ROM), electrically erasable and programmable ROM (EEPROM), mask ROM, flash ROM, NAND flash memory, NOR flash memory, etc.).

In various embodiments of the present disclosure, the memory 130 may store at least one of programs, algorithms, routines, and instructions needed for controlling the GNSS module 227. The memory 130 may store instructions needed for carrying out the functions described herein under the control of the processor 120.

According to an embodiment of the present disclosure, the internal memory 232 may have the form of a solid state drive (SSD). The external memory 234 may include a flash drive, e.g., compact flash (CF), secure digital (SD), micro-SD (micro SD), mini-SD (mini SD), extreme digital (xD), memory stick, or the like. The external memory 234 may be functionally connected to the electronic device 201 through various interfaces. According to an embodiment of the present disclosure, the electronic device 200 may further include a storage device or medium such as a hard drive.

The sensor module 240 may measure physical quantity or sense an operating status of the electronic device 201, and then convert measured or sensed information into electric signals. The sensor module 240 may include, for example, at least one of a gesture sensor 240A, a gyro sensor 240B, an atmospheric (e.g., barometric or barometer) sensor 240C, a magnetic sensor 240D, an acceleration sensor 240E, a grip sensor 240F, a proximity sensor 240G, a color sensor 240H (e.g., red, green, blue (RGB) sensor), a biometric sensor 240I, a temperature-humidity sensor 240J, an illumination sensor 240K, and an ultraviolet (UV) sensor 240M. Additionally or alternatively, the sensor module 240 may include, e.g., an electronic nose (E-nose) sensor (not shown), an electromyography (EMG) sensor (not shown), an EEG electroencephalogram (EEG) sensor (not shown), an electrocardiogram (ECG) sensor (not shown), an infrared (IR) sensor (not shown), an iris scan sensor (not shown), or a finger scan sensor (not shown). Also, the sensor module 240 may include a control circuit for controlling one or more sensors equipped therein.

The input unit 250 may include a touch panel 252, a digital pen sensor (or digital stylus) 254, a key 256, or an ultrasonic input unit 258. The touch panel 252 may recognize a touch input in a manner of capacitive type, resistive type, infrared type, or ultrasonic type. Also, the touch panel 252 may further include a control circuit. In case of a capacitive type, a physical contact or proximity may be recognized. The touch panel 252 may further include a tactile layer. In this case, the touch panel 252 may offer a tactile feedback to a user.

The digital pen sensor 254 may be formed in the same or similar manner as receiving a touch input or by using a separate recognition sheet. The key 256 may include, for example, a physical button, an optical key, or a keypad. The ultrasonic input unit 258 is a specific device capable of identifying data by sensing sound waves with a microphone 288 in the electronic device 201 through an input tool that generates ultrasonic signals, thus allowing wireless recognition. According to an embodiment of the present disclosure, the electronic device 201 may receive a user input from any external device (e.g., a computer or a server) connected thereto through the communication module 220.

The display 260 (e.g., the display 160) may include a panel 262, a hologram 264, or a projector 266. The panel 262 may be, for example, LCD, active matrix OLED (AMO-LED), or the like. The panel 262 may have a flexible, transparent or wearable form. The panel 262 may be formed of a single module with the touch panel 252. The hologram 264 may show a stereoscopic image in the air using interference of light. The projector 266 may project an image onto a screen, which may be located at the inside or outside of the electronic device 201. According to an embodiment of the present disclosure, the display 260 may further include a control circuit for controlling the panel 262, the hologram 264, and the projector 266.

The interface 270 may include, for example, an HDMI 272, a USB 274, an optical interface 276, or a D-subminiature (D-sub) 278. The interface 270 may be contained, for example, in the communication interface 170 shown in FIG. 1. Additionally or alternatively, the interface 270 may include, for example, an mobile high-definition link (MHL) interface, an SD card/multi-media card (MMC) interface, or an infrared data association (IrDA) interface.

The audio module 280 may perform a conversion between sounds and electric signals. At least part of the audio module 280 may be contained, for example, in the input/output interface 150 shown in FIG. 1. The audio module 280 may process sound information inputted or outputted through a speaker 282, a receiver 284, an earphone 286, or a microphone 288.

The camera module 291 is a device capable of obtaining still images and moving images. According to an embodiment of the present disclosure, the camera module 291 may include at least one image sensor (e.g., a front sensor or a rear sensor), a lens (not shown), an image signal processor (ISP), or a flash (e.g., LED or xenon lamp, not shown).

The power management module 295 may manage electric power of the electronic device 201. Although not shown, the power management module 295 may include, for example, a power management integrated circuit), a charger IC, or a battery or fuel gauge.

The PMIC may be formed, for example, of an IC chip or SoC. Charging may be performed in a wired or wireless manner. The charger IC may charge a battery 296 and prevent overvoltage or overcurrent from a charger. According to an embodiment of the present disclosure, the charger IC may have a charger IC used for at least one of wired and wireless charging types. A wireless charging type may include, for example, a magnetic resonance type, a magnetic induction type, or an electromagnetic type. Any additional circuit for a wireless charging may be further used such as a coil loop, a resonance circuit, or a rectifier.

The battery gauge may measure the residual amount of the battery 296 and a voltage, current or temperature in a charging process. The battery 296 may store or create electric power therein and supply electric power to the electronic device 201. The battery 296 may be, for example, a rechargeable battery or a solar battery.

The indicator 297 may show thereon a current status (e.g., a booting status, a message status, or a recharging status) of the electronic device 201 or of its part (e.g., the AP 210). The motor 298 may convert an electric signal into a mechanical vibration. Although not shown, the electronic device 201 may include a specific processor (e.g., GPU) for supporting a mobile TV. This processor may process media data that comply with standards of digital multimedia broadcasting (DMB), digital video broadcasting (DVB), or media flow.

Each of the above-discussed elements of the electronic device disclosed herein may be formed of one or more components, and its name may be varied according to the type of the electronic device. The electronic device disclosed herein may be formed of at least one of the above-discussed elements without some elements or with additional other elements. Some of the elements may be integrated into a single entity that still performs the same functions as those of such elements before integrated.

The term "module" used in this disclosure may refer to a certain unit that includes one of hardware, software and firmware or any combination thereof. The module may be interchangeably used with unit, logic, logical block, component, or circuit, for example. The module may be the minimum unit, or part thereof, which performs one or more particular functions. The module may be formed mechanically or electronically. For example, the module disclosed herein may include at least one of application-specific integrated circuit (ASIC) chip, field-programmable gate arrays (FPGA), and programmable-logic device, which have been known or are to be developed.

In one embodiment of the present disclosure, the electronic device 201 may include an AP 210, a communication processor, and a communication module (220) (e.g. GNSS or GPS module 227). The GNSS or GPS module 227 may have a GNSS engine (controller) 203, a GNSS RF receiver 229A, an antenna 229B, and a power regulator 295B, and may be supplied power from a power source 295A. In various embodiments, the GNSS RF receiver 229A and the antenna 229B may be included as a part in the RF module 229, and the power source 295A and the power regulator 295B may be included in the power management module 295.

In the electronic device 201 having the above configuration, the GNSS engine 203 may obtain location information of the electronic device 201 through the GNSS RF receiver 229A (receiver circuit) and forward the location information to at least one of the AP 210 and the communication processor (not shown).

In one embodiment of the present disclosure, the AP 210 may generate control information including the location identification period on the basis of the received location information and forward the control information to the GNSS module 227. The GNSS engine 203 may control the GNSS RF receiver 229A on the basis of the location identification period contained in the control information. Specifically, the GNSS engine 203 may control supply of power to the GNSS RF receiver 229A (receiver circuit) by regulating the power regulator 295B or switch according to the location identification period. For example, to reduce power consumption due to unnecessary location identification, the GNSS engine 203 may control the power regulator 295B or switch to cut off power to the internal circuit (ADC, LNA or the like) of the GNSS RF receiver 229A.

In one embodiment of the present disclosure, the AP 210 may provide the communication processor with various context information (described later). For example, the AP 210 may collect context information through the sensor module 240 and forward the collected context information to the communication processor. The communication processor may generate control information on the basis of the received context information and the library. Here, the library may be a database or firmware that stores control information mapped with context information. The AP 210 may also generate control information on the basis of collected context information. The communication processor 220 may collect context information through various electrically or functionally connected sensors, convert the collected context information into control information by use of the library, and send the control information to the GNSS module 227.

The GNSS module 227 having the above configuration may be realized as one chip separately from the AP 210 and the communication processor. However, not limited thereto, the GNSS module 227 may also be realized as a single chip including the AP 210 and the communication processor 220.

In one embodiment of the present disclosure, the GNSS module 227 may remain in one of "off" (sleep) state, "on" (idle, standby) state, and "active" state. In the off (sleep) state, power to the receiver circuit (GNSS RF receiver 229A) of the GNSS module 227 is cut off while power to the other parts (e.g. resources like tasks or memory) is supplied. In the on (idle, standby) state, power to the receiver circuit (GNSS RF receiver 229A) is supplied. In the active state, power is supplied to both the receiver circuit (GNSS RF receiver 229A) and the other parts to receive location information.

Figure 3:
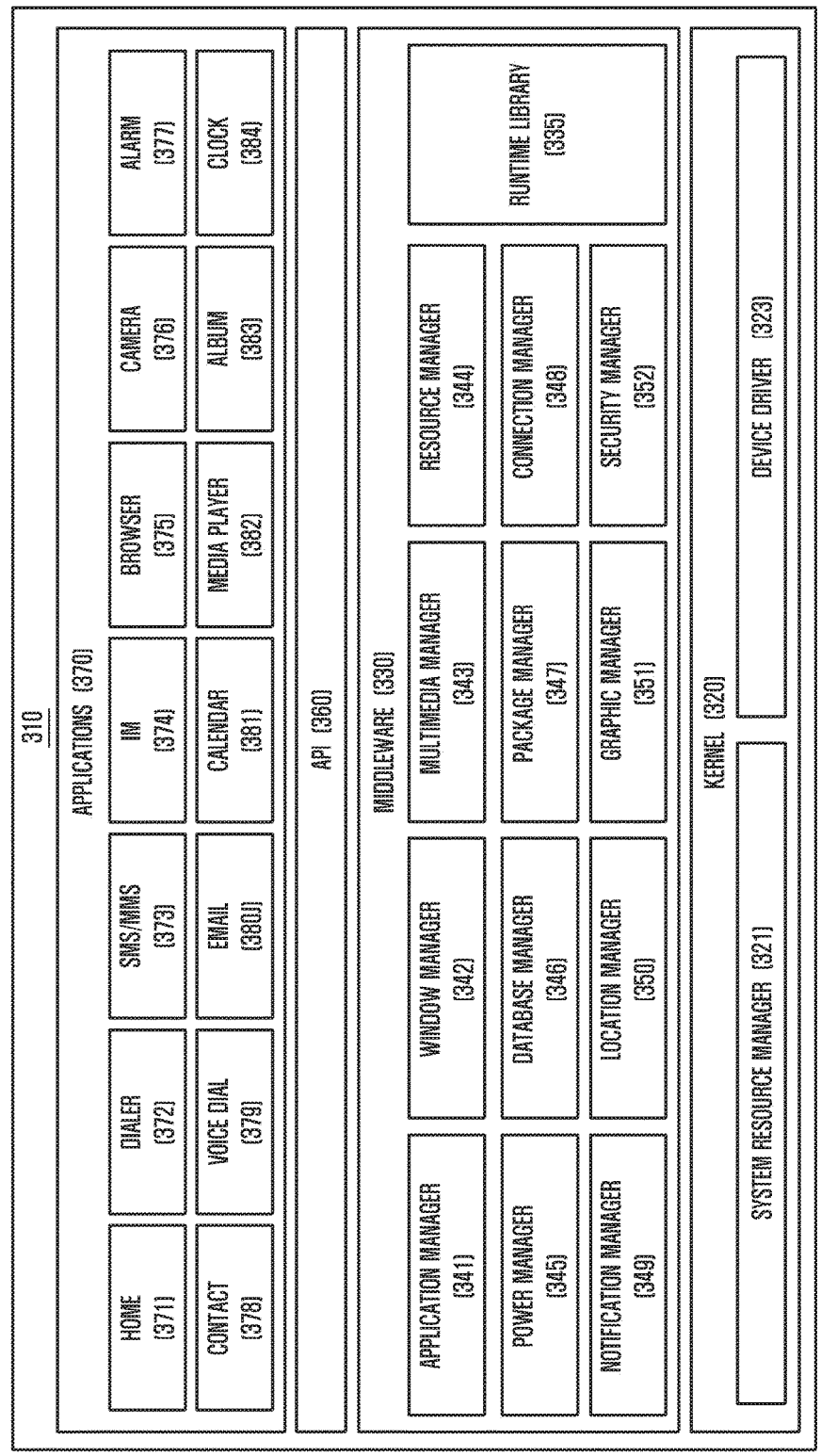
FIG. 3 is a block diagram of a program module, according to various embodiments of the present disclosure.

FIG. 3 is a block diagram illustrating a configuration of a programming module 310 according to an embodiment of the present disclosure.

The programming module 310 may be included (or stored) in the electronic device 101 (e.g., the memory 130) illustrated in FIG. 1 or may be included (or stored) in the electronic device 201 (e.g., the memory 230) illustrated in FIG. 2. At least a part of the programming module 310 may be implemented in software, firmware, hardware, or a combination of two or more thereof. The programming module 310 may be implemented in hardware (e.g., the hardware 200 of FIG. 2), and may include an operating system (OS) controlling resources related to an electronic device (e.g., the electronic device 101) and/or various applications (e.g., an application 370) executed in the OS. For example, the OS may be Android, iOS, Windows, Symbian, Tizen, Bada, and the like.

Referring to FIG. 3, the programming module 310 may include a kernel 320, a middleware 330, an application programming interface (API) 360, and/or the application 370.

The kernel 320 (e.g., the kernel 141 in FIG. 1) may include a system resource manager 321 and/or a device driver 323. The system resource manager 321 may include, for example, a process manager (not illustrated), a memory manager (not illustrated), and a file system manager (not illustrated).

The system resource manager 321 may perform the control, allocation, recovery, and/or the like of system resources. The device driver 323 may include, for example, a display driver (not illustrated), a camera driver (not illustrated), a BT driver (not illustrated), a shared memory driver (not illustrated), a USB driver (not illustrated), a keypad driver (not illustrated), a Wi-Fi driver (not illustrated), and/or an audio driver (not illustrated). Also, according to an embodiment of the present disclosure, the device driver 323 may include an inter-process communication (IPC) driver (not illustrated).

The middleware 330 may include multiple modules previously implemented so as to provide a function used in common by the applications 370. Also, the middleware 330 may provide a function to the applications 370 through the API 360 in order to enable the applications 370 to efficiently use limited system resources within the electronic device. For example, as illustrated in FIG. 3, the middleware 330 (e.g., the middleware 143) may include at least one of a runtime library 335, an application manager 341, a window manager 342, a multimedia manager 343, a resource manager 344, a power manager 345, a database manager 346, a package manager 347, a connectivity or connection manager 348, a notification manager 349, a location manager 350, a graphic manager 351, a security manager 352, and any other suitable and/or similar manager.

The runtime library 335 may include, for example, a library module used by a complier, in order to add a new function by using a programming language during the execution of the application 370. According to an embodiment of the present disclosure, the runtime library 335 may perform functions which are related to input and output, the management of a memory, an arithmetic function, and/or the like.

The application manager 341 may manage, for example, a life cycle of at least one of the applications 370. The window manager 342 may manage GUI resources used on the screen. The multimedia manager 343 may detect a format used to reproduce various media files and may encode or decode a media file through a codec appropriate for the relevant format. The resource manager 344 may manage resources, such as a source code, a memory, a storage space, and/or the like of at least one of the applications 370.

The power manager 345 may operate together with a basic input/output system (BIOS), may manage a battery or power, and may provide power information and the like used for an operation. The database manager 346 may manage a database in such a manner as to enable the generation, search and/or change of the database to be used by at least one of the applications 370. The package manager 347 may manage the installation and/or update of an application distributed in the form of a package file.

The connectivity manager 348 may manage a wireless connectivity such as, for example, Wi-Fi and BT. The notification manager 349 may display or report, to the user, an event such as an arrival message, an appointment, a proximity alarm, and the like in such a manner as not to disturb the user. The location manager 350 may manage location information of the electronic device. The graphic manager 351 may manage a graphic effect, which is to be provided to the user, and/or a user interface related to the graphic effect. The security manager 352 may provide various security functions used for system security, user authentication, and the like. According to an embodiment of the present disclosure, when the electronic device (e.g., the electronic device 101) has a telephone function, the middleware 330 may further include a telephony manager (not illustrated) for managing a voice telephony call function and/or a video telephony call function of the electronic device.

The middleware 330 may generate and use a new middleware module through various functional combinations of the above-described internal element modules. The middleware 330 may provide modules specialized according to types of OSs in order to provide differentiated functions. Also, the middleware 330 may dynamically delete some of the existing elements, or may add new elements. Accordingly, the middleware 330 may omit some of the elements described in the various embodiments of the present disclosure, may further include other elements, or may replace the some of the elements with elements, each of which performs a similar function and has a different name.

The API 360 (e.g., the API 133) is a set of API programming functions, and may be provided with a different configuration according to an OS. In the case of Android or iOS, for example, one API set may be provided to each platform. In the case of Tizen, for example, two or more API sets may be provided to each platform.

The applications 370 (e.g., the applications 134) may include, for example, a preloaded application and/or a third party application. The applications 370 (e.g., the applications 134) may include, for example, a home application 371, a dialer application 372, a SMS/MMS application 373, an instant message (IM) application 374, a browser application 375, a camera application 376, an alarm application 377, a contact application 378, a voice dial application 379, an electronic mail (e-mail) application 380, a calendar application 381, a media player application 382, an album application 383, a clock application 384, and any other suitable and/or similar application(s).

At least a part of the programming module 310 may be implemented by instructions stored in a non-transitory computer-readable storage medium. When the instructions are executed by one or more processors (e.g., the one or more application processors 210), the one or more processors may perform functions corresponding to the instructions. The non-transitory computer-readable storage medium may be, for example, the memory 230. At least a part of the programming module 310 may be implemented (e.g., executed) by, for example, the one or more application processors 210. At least a part of the programming module 310 may include, for example, a module, a program, a routine, a set of instructions, and/or a process for performing one or more functions.

Names of the elements of the programming module (e.g., the programming module 310) according to an embodiment of the present disclosure may change depending on the type of OS. The programming module according to an embodiment of the present disclosure may include one or more of the above-described elements. Alternatively, some of the above-described elements may be omitted from the programming module. Alternatively, the programming module may further include additional elements. The operations performed by the programming module or other elements according to an embodiment of the present disclosure may be processed in a sequential method, a parallel method, a repetitive method, or a heuristic method. Also, some of the operations may be omitted, or other operations may be added to the operations.

In one embodiment of the present disclosure, the electronic device may include a receiver circuit to receive location related information from external devices, and a controller to control the receiver circuit. The controller may obtain location related information from the external devices by use of the receiver circuit, determine the location of the electronic device on the basis of the location related information, and turn off the receiver circuit on the basis of the determination result. In various embodiments, the external devices may be various types of artificial satellites, such as GPS satellites, GLONASS satellites, Galileo satellites, and Compass satellites. The external devices may also be indoor positioning system (IPS) devices.

In one embodiment of the present disclosure, the electronic device may further include at least one processor. The controller may be configured to obtain control information generated by the processor, identify the period for obtaining location related information on the basis of the control information, and generate a signal to turn on or off power supply to the receiver circuit on the basis of the period.

In one embodiment of the present disclosure, the controller may be configured to determine the location of the electronic device by use of the location related information while the receiver circuit is turned on.

In one embodiment of the present disclosure, the electronic device may further include a power control circuit to control power supply to the receiver circuit. For example, the power control circuit may include a power regulator 295B and a switch.

In another embodiment of the present disclosure, the electronic device may further include at least one processor. The controller may be configured to receive control information for receiver circuit control from the processor. In various embodiments, the receiver circuit and the controller may be implemented as a single chip communication module, separately from the processor.

In one embodiment of the present disclosure, the processor may be configured to receive context information of the electronic device through at least one sensor functionally connected to the electronic device, and generate at least a portion of the control information on the basis of the context information.

In one embodiment of the present disclosure, the context information may include information on the movement speed of the electronic device. The processor may be configured to update the period for the receiver circuit to obtain location related information according to the movement speed, and send the updated period as a portion of the control information to the controller.

In one embodiment of the present disclosure, the context information may include information on signal strengths for location related information. The processor may be configured to update the period for the receiver circuit to obtain location related information on the basis of the signal strengths, and send the updated period as a portion of the control information to the controller.

In one embodiment of the present disclosure, the context information may include information on the movement speed of the electronic device, information on user activities of the electronic device, information on applications or functions using location related information, information on signal strengths for location related information, information on states of the battery of the electronic device, and any combination thereof.

Figure 4:
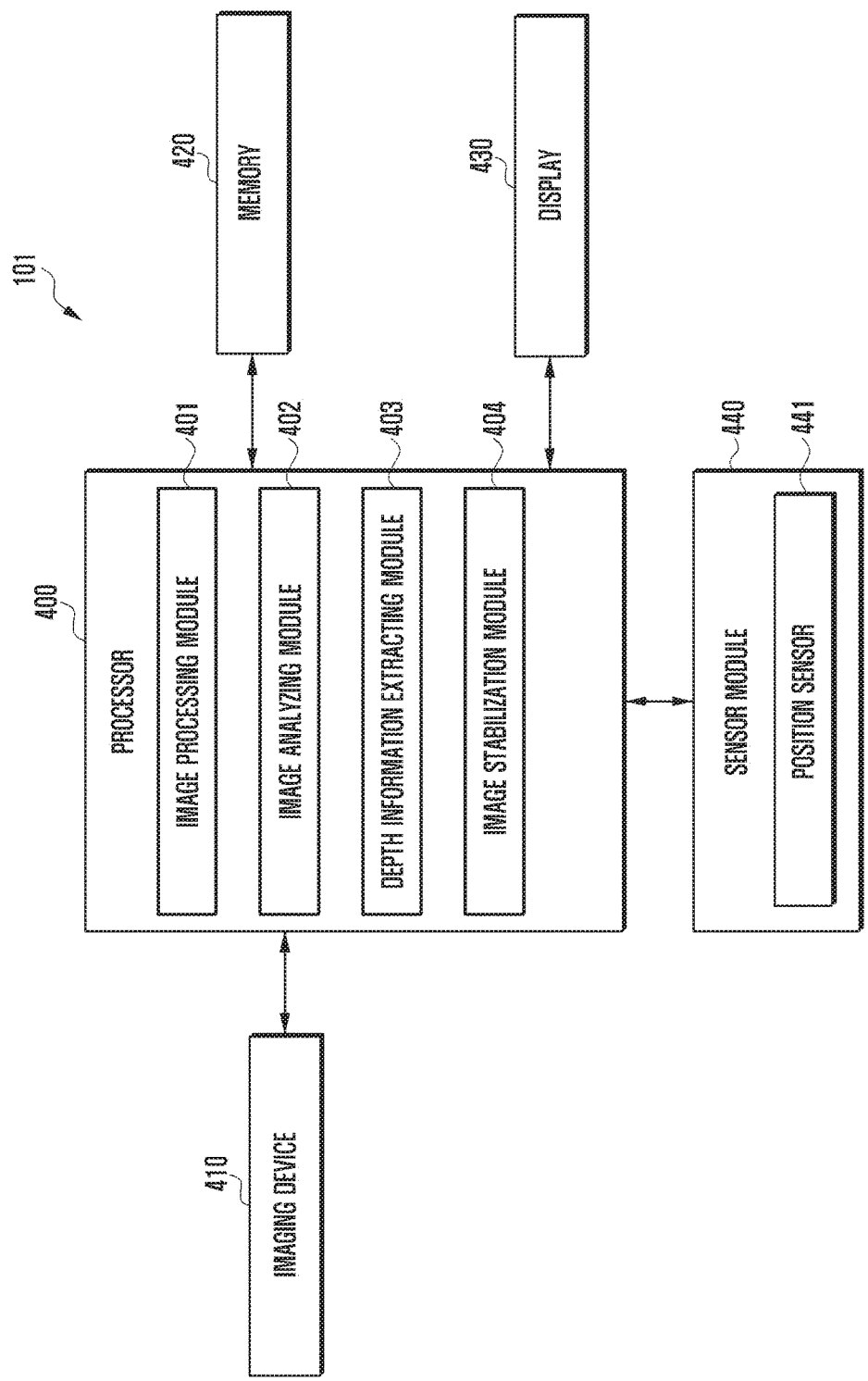
FIG. 4 is a block diagram of an electronic device, according to various embodiments of the present disclosure.

FIG. 4 is a block diagram of an electronic device 101, according to various embodiments of the present disclosure.

Referring to FIG. 4, the electronic device 101, according to an embodiment of the present disclosure, may include, for example, a processor 400, an imaging device 410 (e.g., the camera module 291), a memory 420, a display 430, and a sensor module 440. The processor 400, for example, may include an image processing module 401, an image analyzing module 402, a depth information extracting module 403, and an image stabilization module 404. The memory 420 may include a temporary storage device. The sensor module 440 may include a position sensor 441 {e.g., the gyro sensor 240B, the acceleration sensor 240E, or a depth sensor (not shown)}. The devices and modules shown in the drawing are not essential elements, so other devices may be selectively added, or the mentioned devices or modules may be excluded.

The imaging device 410, according to an embodiment of the present disclosure, may obtain external images. Here, the imaging device 410 may be a device for photographing external images, or may be the camera module 291. The processor 400, according to an embodiment of the present disclosure, may obtain an image that contains a plurality of objects by using the camera module 291. The processor 400, according to an embodiment of the present disclosure, may store the obtained image in the memory 420 (e.g., a temporary storage device).

The image processing module 401 of the processor 400, according to an embodiment of the present disclosure, may be a module that processes image signals. The image processing module 401, according to an embodiment of the present disclosure, may implement the image to a displayable form by classifying the images obtained through the imaging device 410, extracting features thereof, and recognizing patterns thereof.

As illustrated in FIG. 4, the image analyzing module 402 may analyze the image stored in the memory 420 in order to thereby determine whether or not an object contained in the image moves. The depth information extracting module 403 of the processor 400, according to an embodiment of the present disclosure, may calculate and obtain distance data between the imaging device 410 and an object, for example, by using a depth sensor.

The display 430, according to an embodiment of the present disclosure, may detect an input event for configuring a partial area of the screen. The position sensor 441 of the sensor module 440, according to an embodiment of the present disclosure, may obtain position information on the imaging device 410 or the electronic device 101.

The image stabilization module 404 of the processor 400 may select a partial area based on the obtained user's input event information, position information on the imaging device 410, distance data between the imaging device 410 and the object, movement information of the image that is contained in the image, or the like. The processor 400, according to an embodiment of the present disclosure, may configure the image to be stabilized based on the selected partial area. Here, the configuration of the stabilization may refer to an operation of adjusting the size of an area in the entire image or an operation of adjusting a margin of the image such that the size or position of the object that is contained in the selected area remains constant in the adjacent frame based on the selected partial area.

The processor 400, according to an embodiment of the present disclosure, may display the result of stabilizing the image on the screen through the display 430, or may store the same in memory 420.

The processor 400, according to an embodiment of the present disclosure, may obtain an image that contains a plurality of objects. The processor 400, according to an embodiment of the present disclosure, may obtain an image based on: image data that is stored in the memory of the electronic device; image data that is obtained from another electronic device; or image data that is obtained by the camera module 291 of the electronic device. For example, the processor 400 may obtain the image data from another electronic device through a streaming method.

The processor 400, according to an embodiment of the present disclosure, may display an image through the display 430 that is functionally connected to the processor 400. The processor 400, according to an embodiment of the present disclosure, may select a partial area from the image, which includes at least a portion of at least one of a plurality of objects, based on the sizes, movements, or positions of a plurality of objects.

The processor 400, according to an embodiment of the present disclosure, may be configured to stabilize the image based on the selected partial area. Here, the configuration of the stabilization may refer to an operation of adjusting the size of an area in the entire image or an operation of adjusting a margin of the image such that the size or position of the object that is contained in the selected area remains constant in the adjacent frame based on the selected partial area.

The processor 400, according to an embodiment of the present disclosure, may stabilize the image based on the selected partial area, and may control the display 430 to display the stabilized image on the screen. The processor 400, according to an embodiment of the present disclosure, may make a control to store images in the memory 420 based on the selected partial area.

As illustrated in FIG. 4, the processor 400, according to an embodiment of the present disclosure, may select a partial area of the image based on depth information that contains at least one piece of: distance information between the objects contained in the image and the electronic device 101; or disparity information that is obtained from the electronic device 101. The processor 400, according to an embodiment of the present disclosure, may obtain a value of the disparity information (a disparity value) through a stereo camera or a plurality of photodiode cameras, which is a kind of imaging device 410. The processor 400, according to an embodiment of the present disclosure, may obtain a distance information value between the electronic device 101 and the object from the dynamic type of 3D sensor {e.g., structured light or ToF (time of flight)} through an infrared sensor that is mounted on one side of the electronic device 101. The processor 400, according to an embodiment of the present disclosure, may determine the distance information between the object and the electronic device 101 based on metadata that is contained in the image.

The processor 400, according to an embodiment of the present disclosure, may implement the obtained image in the form of a depth map. The processor 400, according to an embodiment of the present disclosure, may configure a singular information value for each object, which is expressed in the depth map, to be different based on the depth information that contains at least one piece of the disparity information or the distance information. Here, the singular information value may be a value corresponding to the area where the depth information value for each position is significantly different from that of surrounding areas. For example, configuring the singular information value to be different may mean configuring color values of the area included in the depth map to be different, or may mean configuring pixel values including brightness and Chroma data values of the same color to be different, and to then be displayed.

If the image contains a plurality of objects, the processor 400, according to an embodiment of the present disclosure, may select a partial area of the image based on the distance difference between the electronic device 101 and each of a plurality of objects. For example, it may be assumed that an image contains the first object and the second object and the first object is closer to the imaging device 410 than the second object. The processor 400 may display the singular information value of the depth map corresponding to the first object in a stronger color than the singular information value of the depth map corresponding to the second object. The processor 400 may select the first object, which is displayed in a stronger color, as a partial area.

The processor 400, according to an embodiment of the present disclosure, may select a partial area of the image based on objects that are positioned within a predetermined distance data from the electronic device 101. For example, the processor 400 may select a singular point of an object that is positioned within a predetermined distance (e.g., 1 m~3 m) from the electronic device 101 as a partial area.

The processor 400, according to an embodiment of the present disclosure, may recognize a predetermined specific object among the objects contained in the image, and may select a partial area of the image based on the recognized specific object. For example, the processor 400 may detect a face object contained in the image in order to thereby select the same as a partial area. Here, the face object may be detected by analyzing (e.g., adaboost) the whole image data and separating a face area from a non-face area. Here, "adaboost" refers to an adaptive boosting method in which a desired result is obtained through a plurality of classifiers.

The processor 400, according to an embodiment of the present disclosure, may frame-trace the detected face object in order to thereby update the position and the size thereof. For example, the processor 400 may select a partial area such that the corresponding object maintains the same coordinates in every frame based on central position coordinates of the detected face object, and may stabilize the image based on the selected partial area.

In the case where the image contains a plurality of objects, the processor 400, according to an embodiment of the present disclosure, may select a partial area of the image based on the size difference of a plurality of objects that are displayed on the screen. For example, in the case where the image contains a plurality of objects including the first object and the second object, the processor 400 may select the first object as a partial area if the ratio of first object to the screen is greater than that of the second object to the screen.

In the case where the image contains a plurality of objects, the processor 400, according to an embodiment of the present disclosure, may select a partial area of the image based on distance data between the plurality of objects. If the image contains a plurality of objects, the processor 400, according to an embodiment of the present disclosure, may make a control to configure the plurality of objects to be different according to the distance data between the plurality of the objects. For example, if the distance between a plurality of objects included in the screen is one-hundred (100) pixels, the processor 400 may configure the weight of the plurality of objects to be high, and if the distance between a plurality of objects included in the screen is 500 pixels, the processor 400 may configure the weight of the plurality of objects to be low.

The processor 400, according to an embodiment of the present disclosure, may detect an input event for selecting a particular area from the image that is displayed through the display 430. The processor 400 may designate the area corresponding to the detected input event as a partial area of the image. For example, processor 400 may detect an input event in which the user selects a particular area, and may detect a singular information value from the image of the particular area. The processor 400, according to an embodiment of the present disclosure, may detect a singular information value that is the same as the singular information value detected in the subsequent frame, and may designate a partial area such that the image may be adjusted in the same position between the detected areas.

As illustrated in FIG. 4, the processor 400, according to an embodiment of the present disclosure, may detect an input event for selecting one face object from the image that is displayed through the display 430. Alternatively, the processor 400, according to an embodiment of the present disclosure, may detect an input event for selecting a plurality of face objects from the displayed image. The processor 400, according to an embodiment of the present disclosure, may detect an input event for selecting a thing object from the displayed image. The processor 400, according to an embodiment of the present disclosure, may detect one of the input events for selecting a background object from the displayed image. The processor 400 may designate one area of the screen, which corresponds to the detected input event, as a selected partial area.

The processor 400, according to an embodiment of the present disclosure, may determine whether or not the position of at least one of the image or the electronic device 101 is changed while the stabilized image is displayed. For example, a change in the position of the electronic device 101 may be detected through a position sensor 441. The position sensor 441 may include a gyro sensor function, a GPS function, or the like.

The processor 400, according to an embodiment of the present disclosure, may determine whether or not to change the partial area based on predetermined reference attribute values (e.g., a size value of an object compared to the screen, a moving speed value of an object or the electronic device 101, size values of the electronic device 101 and an object, a moving cycle of an object or the electronic device 101, or the like).

The processor 400, according to an embodiment of the present disclosure, may determine whether or not to change the partial area based on at least one piece of: size information of an object contained in the image compared to the screen; moving speed information of an object displayed on the screen; movement information of an object displayed on the screen; distance information between an object displayed on the screen and the electronic device; movement comparison information that is obtained by comparing movement information of an object with movement information of the electronic device 101; or view related information in which an object can be displayed on the screen.

As illustrated in FIG. 4, the processor 400, according to an embodiment of the present disclosure, may determine whether or not to re-designate the partial area based on the determination result of the change. The processor 400, according to an embodiment of the present disclosure, may prepare, or perform, a photographing function based on the configured partial area. The processor 400, according to an embodiment of the present disclosure, may determine whether or not a change of the image or the electronic device 101 is equal to, or more than, a predetermined change (e.g., a moving speed, a ratio of the area to the full screen, or the like) in order to thereby determine whether or not to change the partial area. For example, in the case where the processor 400 initially designates the first object as a partial area, which is positioned closest to the imaging device 410, if a change in the attributes of the first object (e.g., a moving speed value more than a reference speed value) is detected, the processor 400 may change the selected partial area to another object (e.g., the second object).

In the case where the processor 400, according to an embodiment of the present disclosure, initially designates the first object as a partial area, if the ratio of the first object area to the full screen becomes lower than a predetermined reference ratio according to the movement of the first object, the processor 400 may change the designated partial area to another object (e.g., the second object). In the case where the processor 400, according to an embodiment of the present disclosure, initially designates the first object as a partial area, if the moving speed of the first object exceeds a predetermined reference speed value, the processor 400 may change the designated partial area to the second object, and then if the moving speed of the first object does not exceed the predetermined reference speed value, the processor 400 may change the designated partial area to the first object again.

As illustrated in FIG. 4, the processor 400, according to an embodiment of the present disclosure, may compare the moving attributes of the object and the imaging device 410 in order to thereby determine whether or not to change the designated partial area. The processor 400, according to an embodiment of the present disclosure, may determine whether or not to change the designated partial area based on the comparison of the moving direction of the object with the moving direction of the imaging device 410. For example, if the object moves to the left and the imaging device 410 moves to the left, the processor 400 may determine that the moving attributes are similar to each other, and may not change the designated partial area. As another example, if the object moves to the left and the imaging device 410 moves to the right, the processor 400 may determine that the moving attributes are not similar, and may change the designated partial area to the area to which the configured object does not belong.

The processor 400, according to an embodiment of the present disclosure, may compare the moving speed of the object with the moving speed of the imaging device 410. For example, the processor may identify that the object, which is being photographed by the imaging device 410, is moving to the left at 0.05 m/s and the imaging device 410 is moving to the left at 0.049 m/s. The processor 400 may determine that the moving attributes (e.g., the moving direction or the moving speed) of the object and the imaging device 410 are similar to each other, and may not change the designated partial area. As another example, the processor 400 may identify that the object, which is being photographed by the imaging device 410, is moving to the left at 0.15 m/s and the imaging device 410 is moving to the left at 0.01 m/s. The processor 400 may determine that the moving attributes of the object and the imaging device 410 are not similar and exceed a reference moving attribute value, and may change the designated partial area.

The processor 400, according to an embodiment of the present disclosure, may designate a partial area for each of a plurality of images. For example, the processor 400 may select the first partial area in the first image, and may select the second partial area in the second image. Here, the first partial area and the second partial area may be particular areas for different objects.

As illustrated in FIG. 4, the processor 400, according to an embodiment of the present disclosure, may obtain the second image that contains a plurality of objects through the camera module 291. The processor 400, according to an embodiment of the present disclosure, may select a partial area that includes at least a portion of at least one of a plurality of the objects that are contained in the second obtained image. The processor 400, according to an embodiment of the present disclosure, may stabilize the second image based on the selected partial area. The processor 400, according to an embodiment of the present disclosure, may be configured to synthesize and adjust the stabilized image and the second stabilized image. The processor 400, according to an embodiment of the present disclosure, may display the synthesized and adjusted image on the screen through the display 430, or may store the same in the memory 420.

The processor 400, according to an embodiment of the present disclosure, may adopt a plurality of imaging devices 410. The processor 400, according to an embodiment of the present disclosure, may select the first partial area that includes at least a portion of at least one of a plurality of objects that are contained in the first image obtained through the first imaging device of a plurality of imaging devices. The processor 400, according to an embodiment of the present disclosure, may select the second partial area that includes at least a portion of at least one of a plurality of objects that are contained in the second image obtained through the second imaging device of a plurality of imaging devices. The processor 400, according to an embodiment of the present disclosure, may be configured to synthesize and adjust the first image and the second image based on the selected partial area and the second partial area.

If the first image and the second image, according to an embodiment of the present disclosure, contain the same object, the first weight area configured in the first image may be different from the second weight area configured in the second image.

Figure 5A:
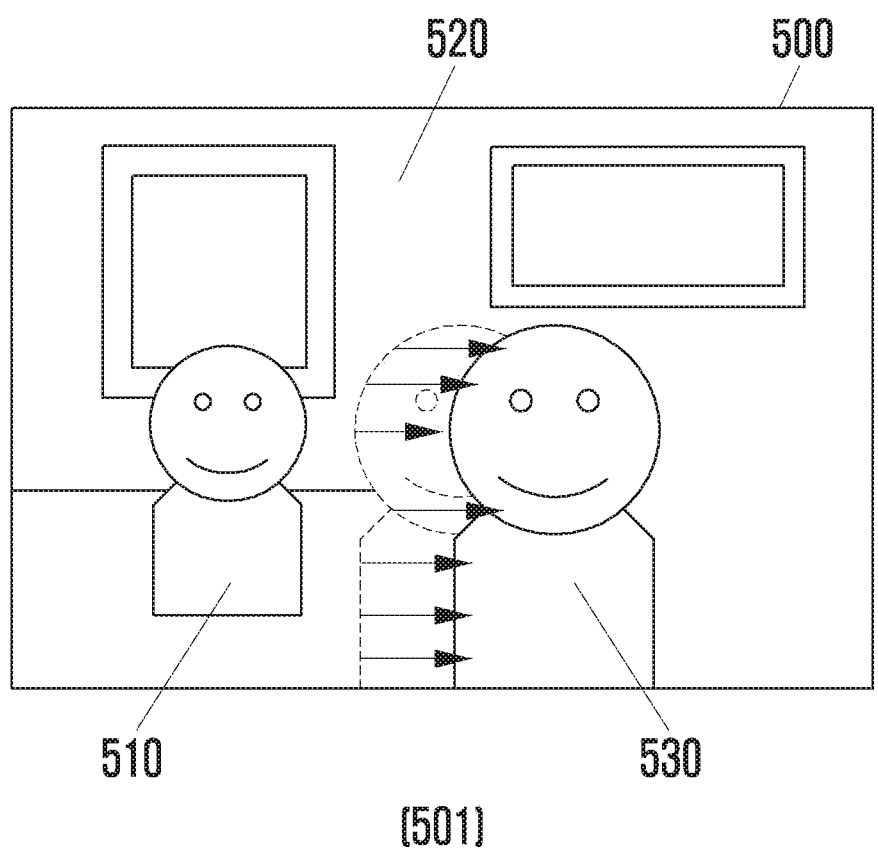
Figure 5B:
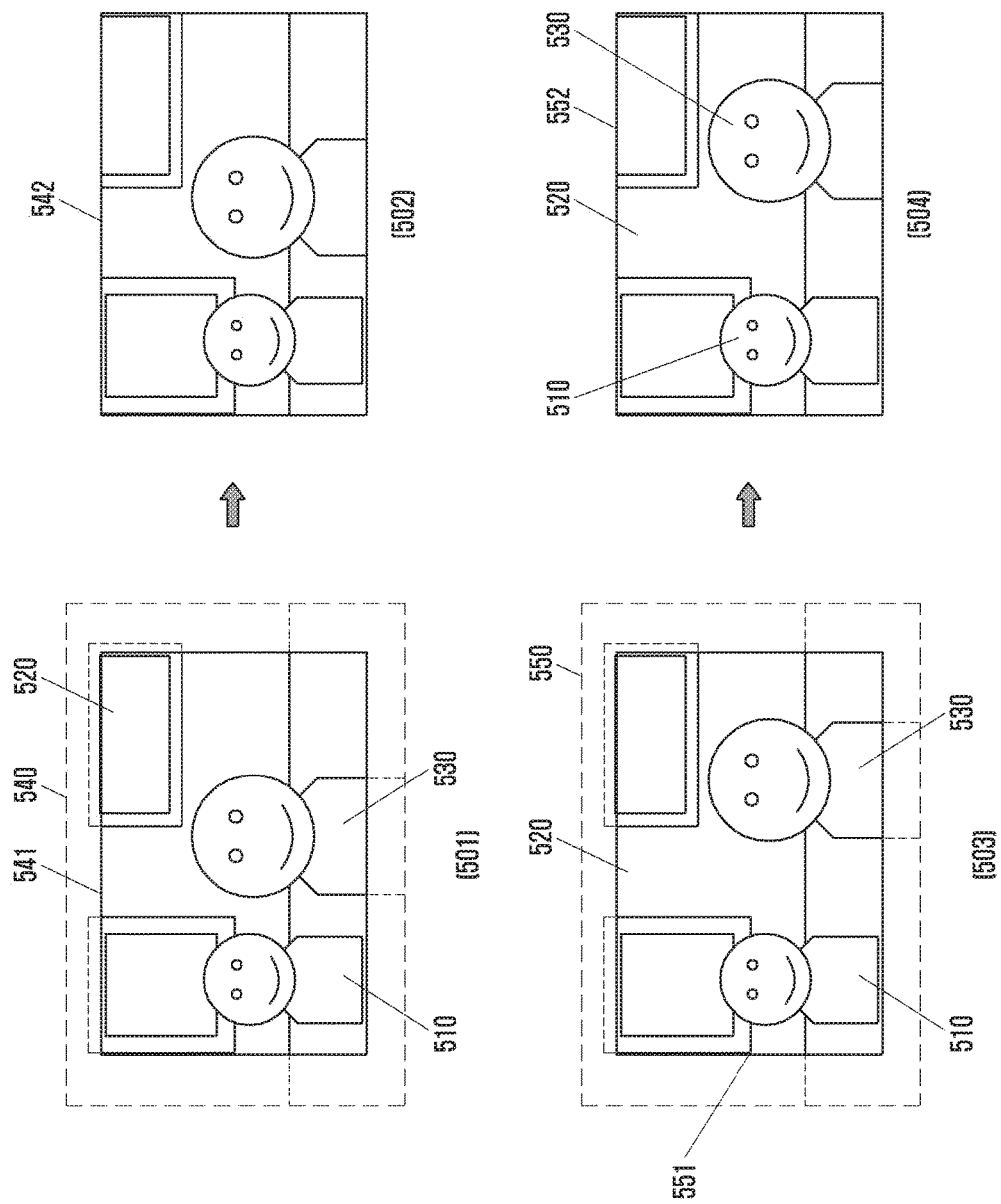

FIGS. 5A to 5C illustrate the adjustment of an image, according to various embodiments of the present disclosure.

The electronic device 101, according to various embodiments of the present disclosure, may obtain an image that contains a plurality of objects through the camera or camera module 291. The electronic device 101, according to an embodiment of the present disclosure, may display a pre-stored image on the screen in order to thereby configure a partial area, or may configure a partial area for an image that is displayed on the screen during the execution of a video function.

Referring to FIG. 5A, the electronic device 101 may display an image on the screen 500. The screen 500 may contain the first object 510, the second object 520, and the third object 530. The first object 510 and the third object 530 may be persons, and the second object 520 may be a background that includes a plurality of items or things. The electronic device 101 may obtain an image that is changed according to the movement of the third object 530 during the video function.

Referring to FIG. 5B, the electronic device 101 may select one area of the screen with respect to the image before the movement of the third object 530 and with respect to the image after the movement of the third object 530, respectively, and may stabilize the same. Referring to diagrams 501 and 502, the electronic device 101 may display the stabilization screen according to the selection of the background area before the movement of the third object 530. Referring to diagram 501, the electronic device 101 may select the first partial area 541 that is the background of the screen 540. Referring to diagram 502, the electronic device 101 may perform the image stabilization based on the first selected partial area 542. Here, the execution of the stabilization may refer to an operation of adjusting the size of an area in the entire image or an operation of adjusting a margin of the image such that the size or position of the object that is contained in the selected area remains constant in the adjacent frame based on the selected partial area.

Referring to diagrams 503 and 504, the electronic device 101 may display the stabilization screen according to the selection of the background area after the movement of the third object 530. Referring to diagram 503, the electronic device 101 may select the first partial area 551 that is the background of the screen 550. Referring to diagram 504, the electronic device 101 may perform the image stabilization based on the first selected partial area 552.

Referring to diagrams 501 and 503, as illustrated in FIG. 5B, since only the third object 530 moves, while the imaging device of the electronic device 101 does not move, the electronic device 101 may select the same partial area 541 or 551 in the screen 540 or 550. Referring to diagrams 502 and 504, the electronic device 101 may perform the stabilization function (e.g., cropping), and may display the image 542 or 552 in which the background screen is maintained and only the third object 530 has moved, compared to the screen 540 or 550.

Referring to FIG. 5C, the electronic device 101 may select one area of the screen with respect to the image before the movement of the third object 530 and with respect to the image after the movement of the third object 530, respectively, and may stabilize the same. Referring to diagrams 505 and 506, the electronic device 101 may display the stabilization screen according to the selection of a person object area before the movement of the third object 530. Referring to diagram 505, the electronic device 101 may select the first partial area 561 that selects the third object 530 of the screen 560. Referring to diagram 506, the electronic device 101 may perform the image stabilization based on the first selected partial area 562. Here, the execution of the stabilization may refer to an operation of adjusting the size of an area in the entire image or an operation of adjusting a margin of the image such that the size or position of the object that is contained in the selected area remains constant in the adjacent frame based on the selected partial area.

Referring to diagrams 507 and 508, the electronic device 101 may display the stabilization screen according to the selection of a face object area after the movement of the third object 530. Referring to diagram 507, the electronic device 101 may select the first partial area 571 for selecting the third object 530. Referring to diagram 508, the electronic device 101 may perform the image stabilization based on the first selected partial area 572. The electronic device 101 may scale the stabilized image result up. The electronic device, according to an embodiment of the present disclosure, may store the scaled-up image, or may display the same through the display.

Referring to diagrams 505 and 507, the electronic device 101 may select different partial areas 561 and 571 for selecting the third object 530 when the third object 530 moves in the screens 560 and 570. Referring to diagram 508, the electronic device 101 may display the image 572 in which the background has been moved and the object is maintained when performing the stabilization function (e.g., cropping).

FIG. 6 illustrates the adjustment of an image to correspond to the movement of the imaging device 620, according to various embodiments of the present disclosure.

Referring to FIG. 6, the electronic device 101, according to an embodiment of the present disclosure, may obtain an image through the imaging device 620.

Referring to diagram 601, the screen 600 including the first object 610 and the second object 630 may be displayed through the imaging device 620. The imaging device 620 may be moved. For example, the imaging device 620 may be moved by an unintentional hand tremor or a panning operation of the user of the imaging device 620. Here, the panning, in a movement relationship between a moving subject and a fixed background, may be a type or kind of shooting operation in which the moving subject is fixed to the screen while the background is moved.

Referring to diagram 602, the electronic device 101 may select a partial area 641 in the screen 640 before the movement of the imaging device 620. The electronic device 101 may configure a partial area for the first object 610, a partial area for the second object 630, a partial area for the first object 610 and the second object 630, or a partial area for the area except for the first object 610 and the second object 630. Referring to diagram 603, the electronic device 101 may display the result screen 642 based on the configured partial area.

Referring to diagram 604, as illustrated in FIG. 6, the electronic device 101 may configure a partial area 651 in the screen 650 after the movement of the imaging device 620. The electronic device 101 may configure a partial area for the first object 610, a partial area for the second object 630, a partial area for the first object 610 and the second object 630, or a partial area for the area except for the first object 610 and the second object 630. Referring to diagram 605, the electronic device 101 may display the result screen 652 based on the configured partial area.

The electronic device 101, according to an embodiment of the present disclosure, may extract partial areas 641 and 651 that contain the object in common from the original screens 640 and 650 in order to thereby obtain image adjustment result screens 642 and 652.

The electronic device 101 may increase the size of the result screen 642 or 652 for the partial area to the size of the original screen 640 or 650. The electronic device 101, according to an embodiment of the present disclosure, may store the scaledup image, or may display the same on the screen through the display 430.

Figure 7:
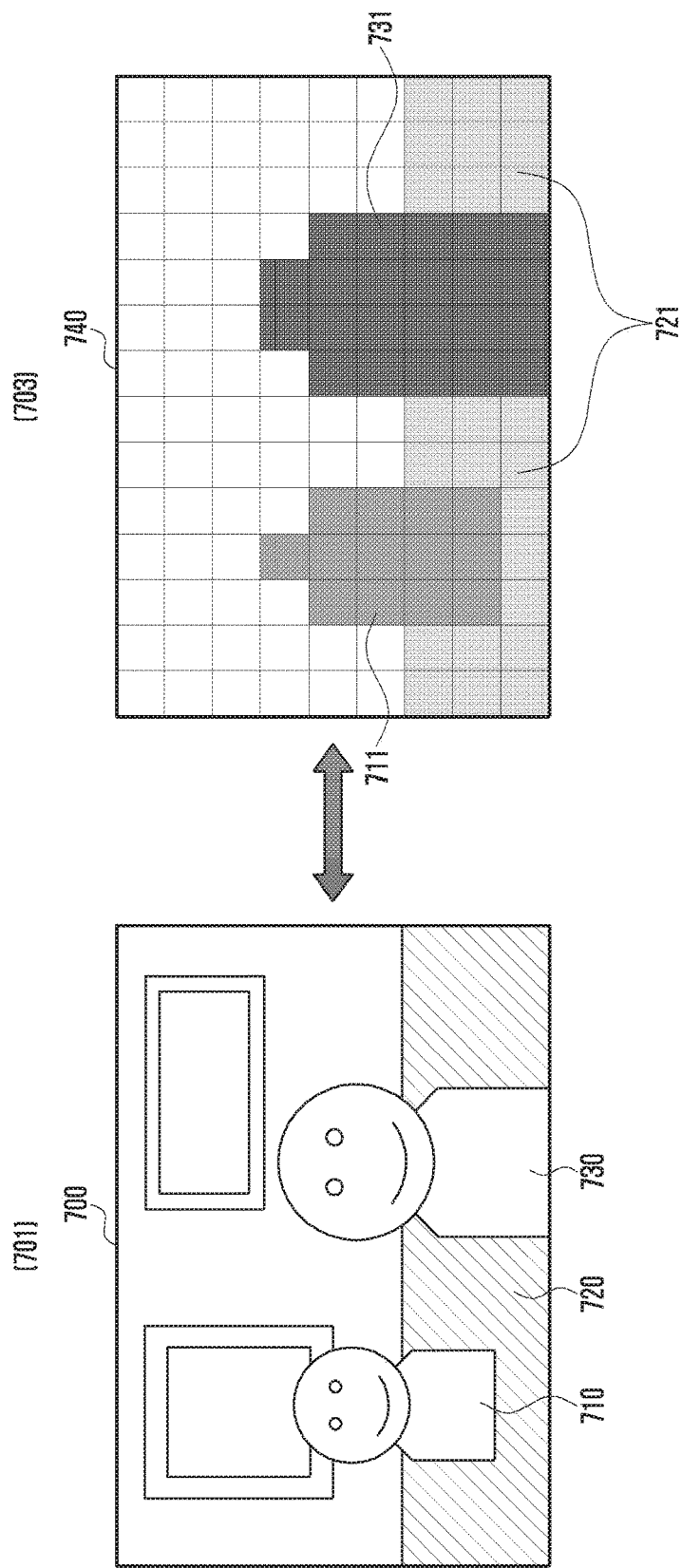
FIG. 7 illustrates the adjustment of an image to correspond to depth information of an image, according to various embodiments of the present disclosure.

FIG. 7 illustrates the adjustment of an image to correspond to depth information (e.g., distance information) of an image, according to various embodiments of the present disclosure.

The electronic device 101 (e.g., electronic device 201), according to an embodiment of the present disclosure, may obtain external images. The electronic device 101 may display the obtained external images through a display.

Referring to FIG. 7, according to the diagram 701, the electronic device 101 may display the screen 700 that contains the first object 710, the second object 720, and the third object 730. For example, the first object 710 and the third object 730 may be persons, and the second object 720 may be a thing object.

Referring to diagram 703 of FIG. 7, the electronic device 101 may extract and analyze depth information. The electronic device 101, according to an embodiment of the present disclosure, may identify disparity information (a disparity value) that is obtained through a stereo camera or a plurality of photodiode cameras, or may identify distance information between the electronic device 101 and the object by the dynamic type of three dimensional (3D) sensor {e.g., structured light or time of flight (ToF)} through an infrared sensor.

The electronic device 101, according to an embodiment of the present disclosure, may implement a depth map 740 that includes the first singular point 711, the second singular point 721, and the third singular point 731 based on the identified information. Here, the singular points may be displayed in different colors from each other based on the depth information (e.g., the disparity information or the distance information) between the electronic device 101 and the objects 710, 720, and 730. For example, since the third object 730 is closest to the electronic device 101, the third singular point 731 corresponding to the third object 730 may be displayed in a darker color in the depth map 740.

The electronic device 101, according to an embodiment of the present disclosure, may determine one of the first singular point 711, the second singular point 721, or the third singular point 731 to be a partial area. The electronic device 101 may adjust the image based on the determined partial area, and may display the adjusted image on the screen or may store the same.

Figure 8:
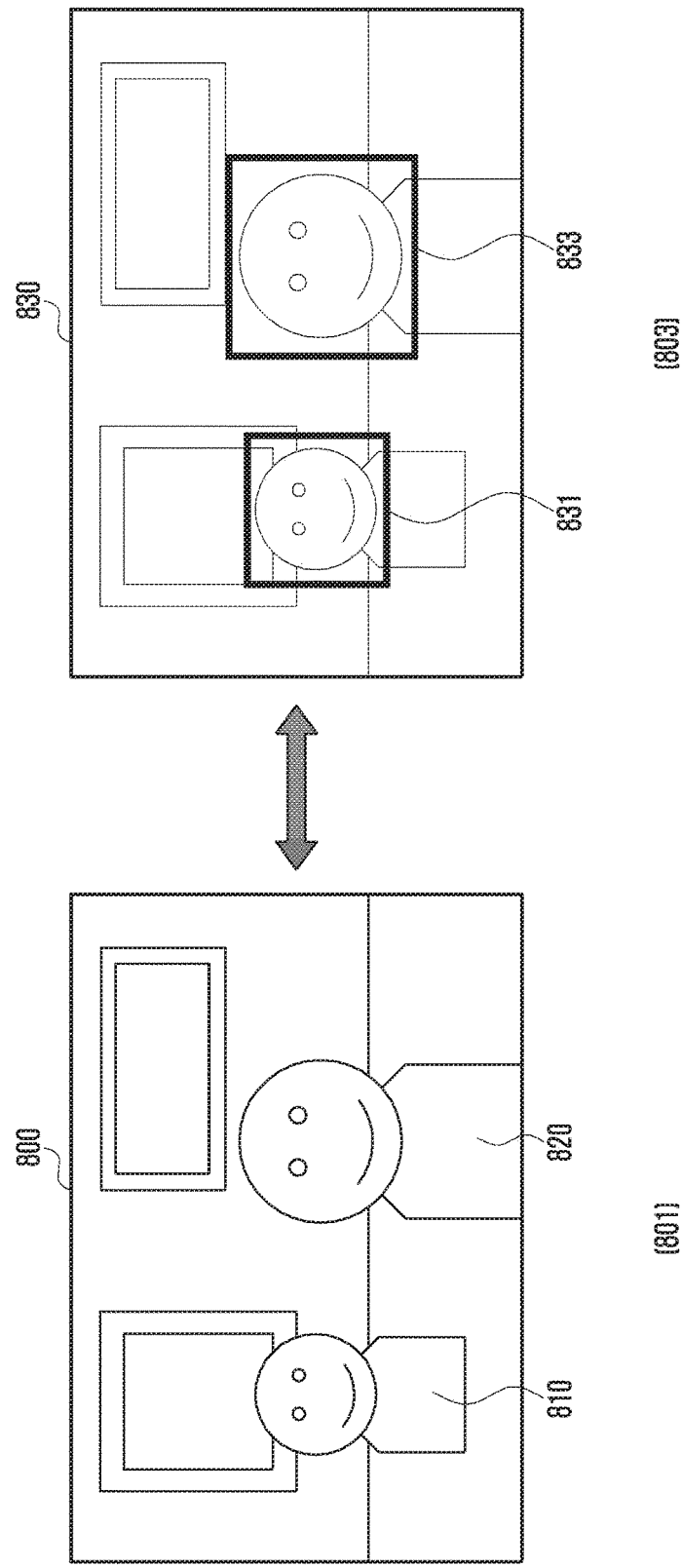
FIG. 8 illustrates the configuration of a partial area of an image, according to various embodiments of the present disclosure.

FIG. 8 illustrates the configuration of a partial area of an image, according to various embodiments of the present disclosure.

The electronic device 101, according to an embodiment of the present disclosure, may obtain images, and may display the images through the display.

Referring to FIG. 8, the diagram 801, the electronic device 101 may display the screen 800 that includes the first object 810 and the second object 820. Referring to diagram 803, the electronic device 101 may recognize a specific object in order to thereby configure a partial area. The electronic device 101, according to an embodiment of the present disclosure, may analyze (e.g., adaboost) the entire image data, and may separate an area similar to a face from other areas in order to thereby detect the same. Here, "adaboost" refers to an adaptive boosting method in which a desired result is obtained through a plurality of classifiers. The electronic device 101 may configure a partial area based on the first face object 831 and the second face object 833, which are contained in the screen 830.

The electronic device 101, according to an embodiment of the present disclosure, may adjust the image based on the configured partial area, and may display the adjusted image on the screen or may store the same.

Figure 9:
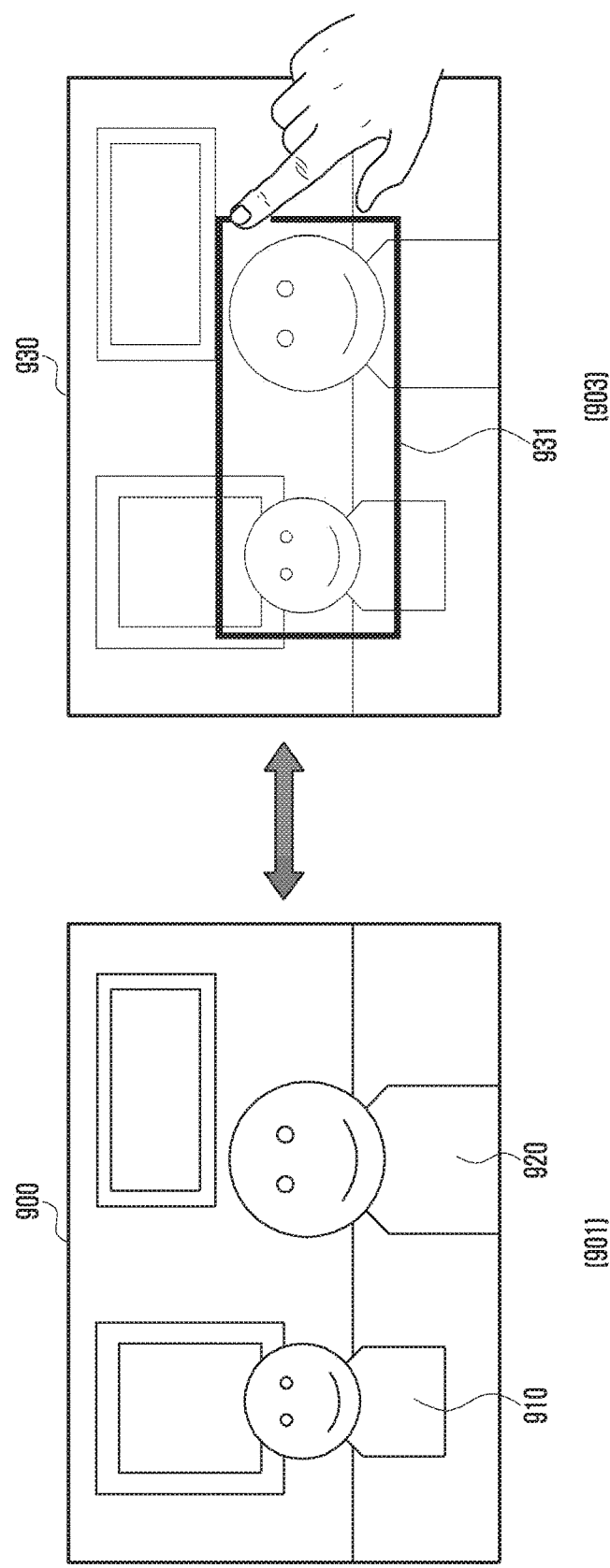
FIG. 9 illustrates the configuration of a partial area of an image depending on a user input, according to various embodiments of the present disclosure.

FIG. 9 illustrates the configuration of a partial area of an image depending on a user input, according to various embodiments of the present disclosure.

The electronic device 101, according to an embodiment of the present disclosure, may obtain images, and may display the images through the display.

Referring to FIG. 9, the diagram 901, the electronic device 101 may display the screen 900 that includes the first object 910 and the second object 920. Referring to diagram 903, the electronic device 101 may detect an input event for selecting the object that is displayed in the image and display the screen 930. If the electronic device 101, according to an embodiment of the present disclosure, detects an input event for selecting an area displayed in the image, the electronic device 101 may configure the area corresponding to the detected input event as a partial area 931. For example, the electronic device 101 may detect an input event for selecting a plurality of face objects.

The electronic device 101 may adjust the image based on the configured partial area, and may display the adjusted image on the screen or may store the same.

Figure 10:
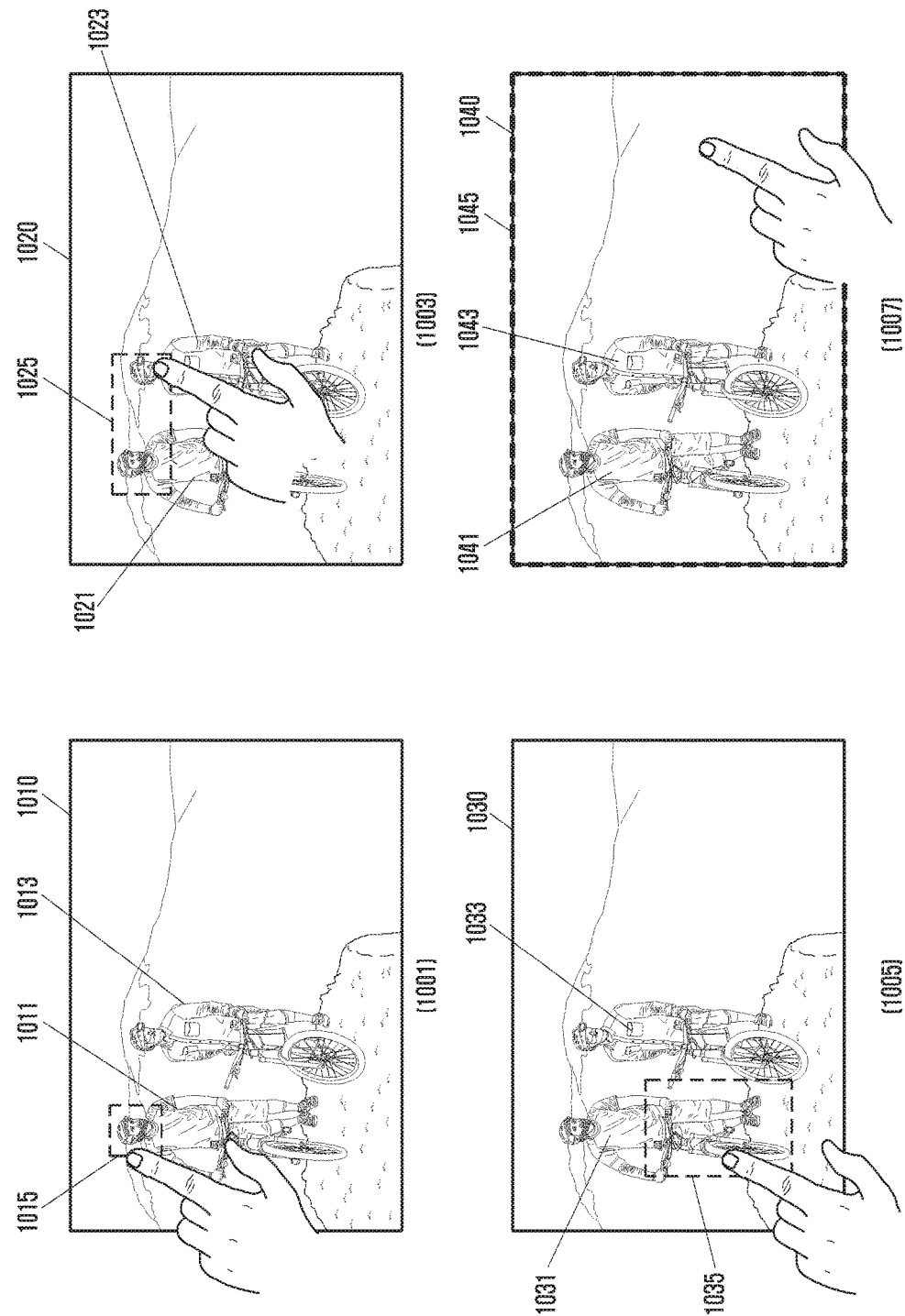
FIG. 10 illustrates the configuration of a partial area of an image, according to various embodiments of the present disclosure.

FIG. 10 illustrates the configuration of a partial area of an image, according to various embodiments of the present disclosure.

The electronic device 101, according to an embodiment of the present disclosure, may detect a user's input event for configuring a partial area.

Referring to FIG. 10, the diagram 1001, the electronic device 101 may display the screen 1010 that includes the first object 1011 and the second object 1013. The electronic device 101, according to an embodiment of the present disclosure, may detect an input event for selecting a face object 1015 of the first object 1011. In response to the input event for detecting the face object 1015, the electronic device 101 may configure the area corresponding to the face object 1015 as a partial area.

Referring to diagram 1003 in FIG. 10, the electronic device 101 may display the screen 1020 that contains the first object 1021 and the second object 1023. The electronic device 101, according to an embodiment of the present disclosure, may detect an input event for selecting face objects 1025 of the first object 1021 and the second object 1023. In response to the input event for detecting the face objects 1025, the electronic device 101 may configure the area corresponding to the face objects 1025 as a partial area.

Referring to diagram 1005 in FIG. 10, the electronic device 101 may display the screen 1030 that includes the first object 1031 and the second object 1033. The electronic device 101, according to an embodiment of the present disclosure, may detect an input event for selecting a particular area 1035 (e.g., a thing object or an area of the screen) other than the first object 1031 and the second object 1033. In response to the input event for selecting the particular area 1035, the electronic device 101 may configure the area corresponding to the particular area 1035 as a partial area.

Referring to diagram 1007 in FIG. 10, the electronic device 101 may display the screen 1040 that contains the first object 1041 and the second object 1043. The electronic device 101, according to an embodiment of the present disclosure, may detect an input event for selecting the background 1045. In response to the input event for selecting the background 1045, the electronic device 101 may configure the area corresponding to the background 1045 as a partial area.

The electronic device 101 may adjust the image based on the configured partial area, and may display the adjusted image on the screen or may store the same.

Figure 11A:
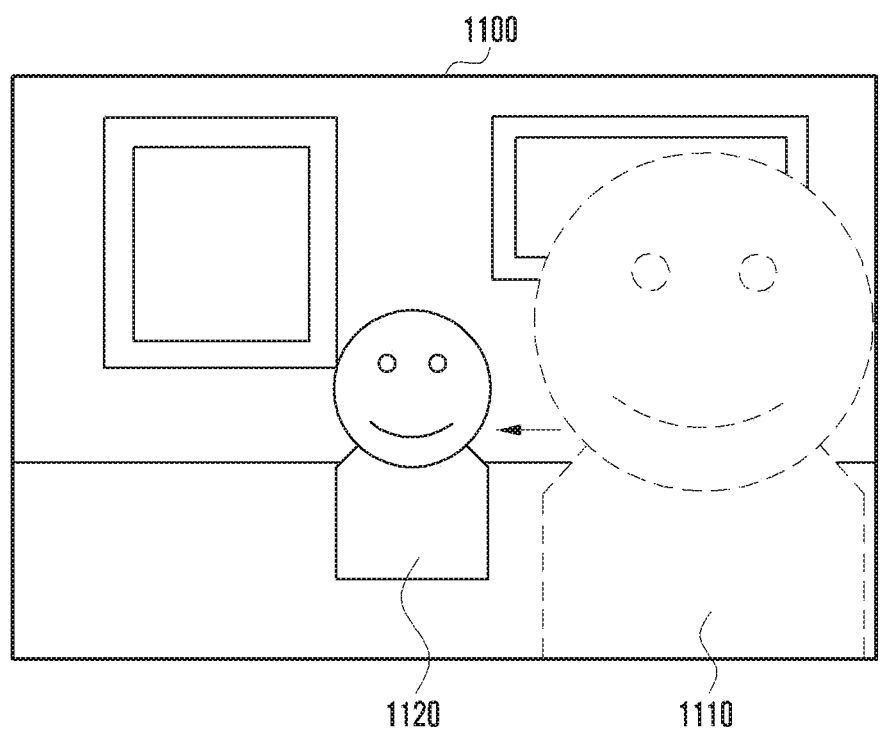
FIGS. 11A, 11B, and 11C illustrate a change of a partial area corresponding to a change of an object contained in the image, according to various embodiments of the present disclosure.
Figure 11B:
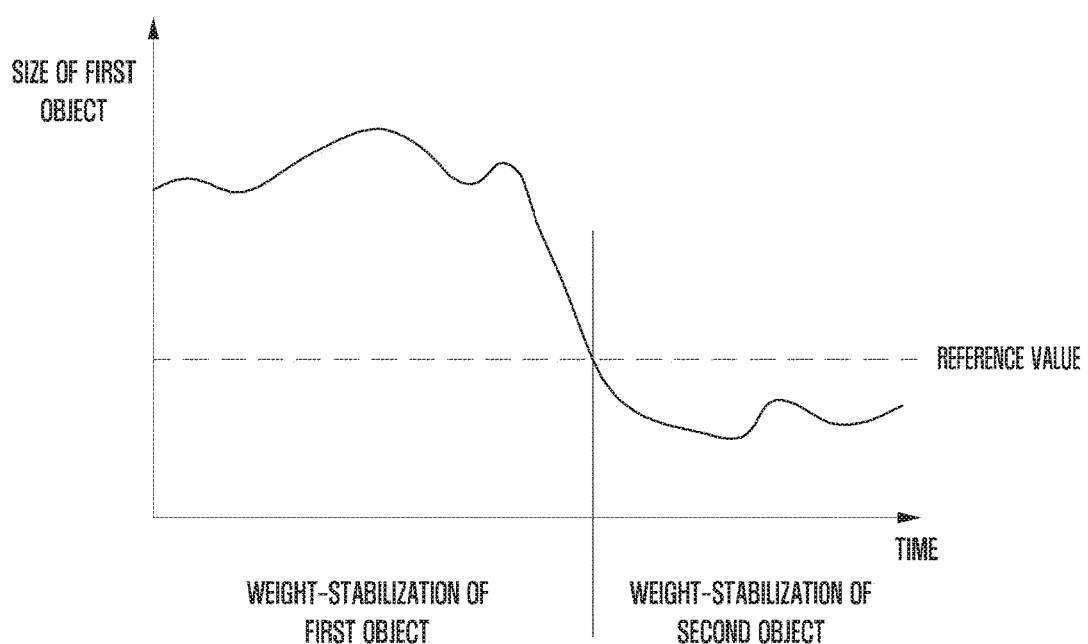
Figure 11C:
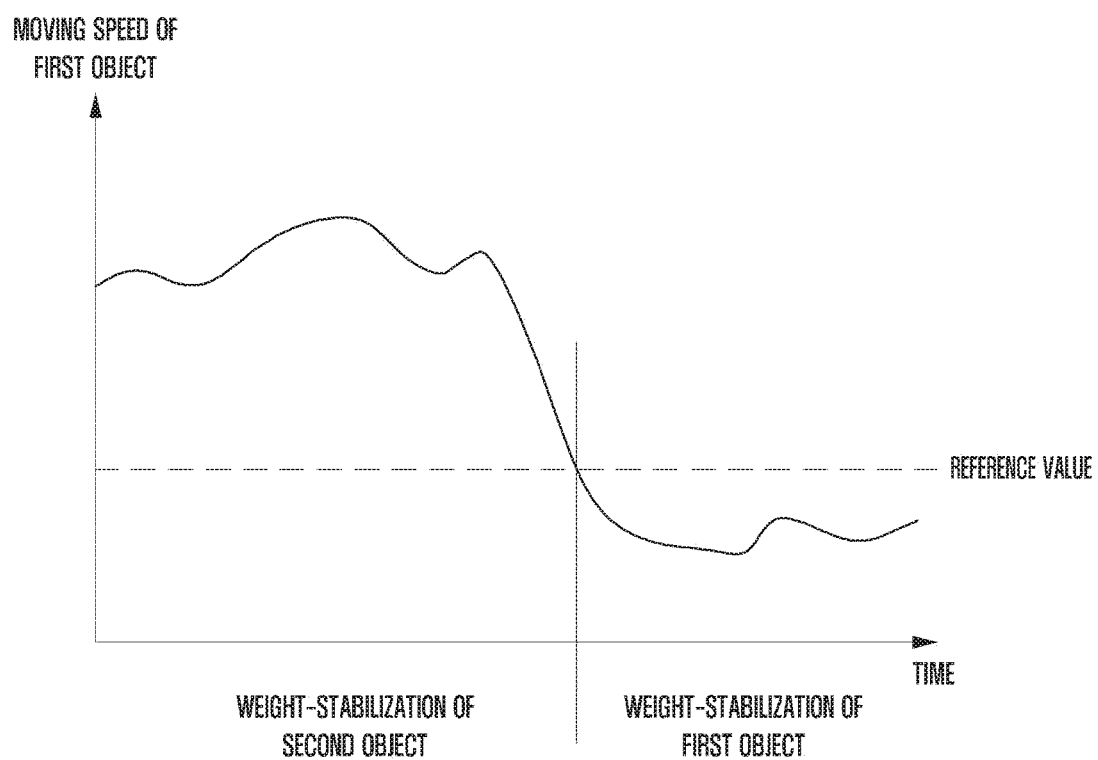

FIGS. 11A, 11B, and 11C illustrate a change of a partial area corresponding to a change of an object contained in the image, according to various embodiments of the present disclosure.

The electronic device 101, according to an embodiment of the present disclosure, may display an object that moves in the screen 1100.

Referring to FIG. 11A, the electronic device 101 may display the object 1110 that is positioned in the first position and the object 1120 that has moved to the second position. Here, in this example, the object 1110, which is positioned in the first position, and the object 1120, which has moved to the second position, may be the same person. The electronic device 101, according to an embodiment of the present disclosure, may change the partial area of the screen when the movement of the object is detected, or when moving speed information of the object or the ratio of the object to the screen is detected according to the movement of the object. The electronic device 101, according to an embodiment of the present disclosure, may automatically change the partial area based on a predetermined reference value.

Referring to FIG. 11B, the electronic device 101, according to an embodiment of the present disclosure, may identify a change in the size of object contained in the screen with respect to the full screen during the execution of the video function. According to an embodiment of the present disclosure, the size of the first object compared to the full screen may exceed a predetermined reference value, and then may become lower than the predetermined reference value as time goes by. For example, as illustrated in FIG. 11B, provided that the size of the full screen is "1" and a reference value is 0.1, the ratio of the first object to the full screen 1 may be 0.15, and then may change to 0.05 as time goes by.

If the first object exceeds a predetermined reference value, the electronic device 101 may configure the area related to the first object as a partial area, and if the first object becomes equal to, or less than, a predetermined reference value, the electronic device 101 may change the partial area from the first object to the second object. The electronic device 101 may display the image again, or may store the same based on the changed partial area.

Referring to FIG. 11C, the electronic device 101 may identify a change in the moving speed of the object during the execution of a video function, according to an embodiment. According to an embodiment of the present disclosure, the moving speed value of the first object may exceed a reference value, and then may change to be equal to, or less than, a predetermined reference value with passage of time. If the moving speed value of the first object exceeds a predetermined reference value, the electronic device 101 may configure the second object other than the first object as a partial area. If the moving speed value of the first object changes to be equal to, or less than, a predetermined reference value, the electronic device 101 may change the partial area to the first object. The electronic device 101 may display the image again, or may store the same based on the changed partial area.

Figure 12:
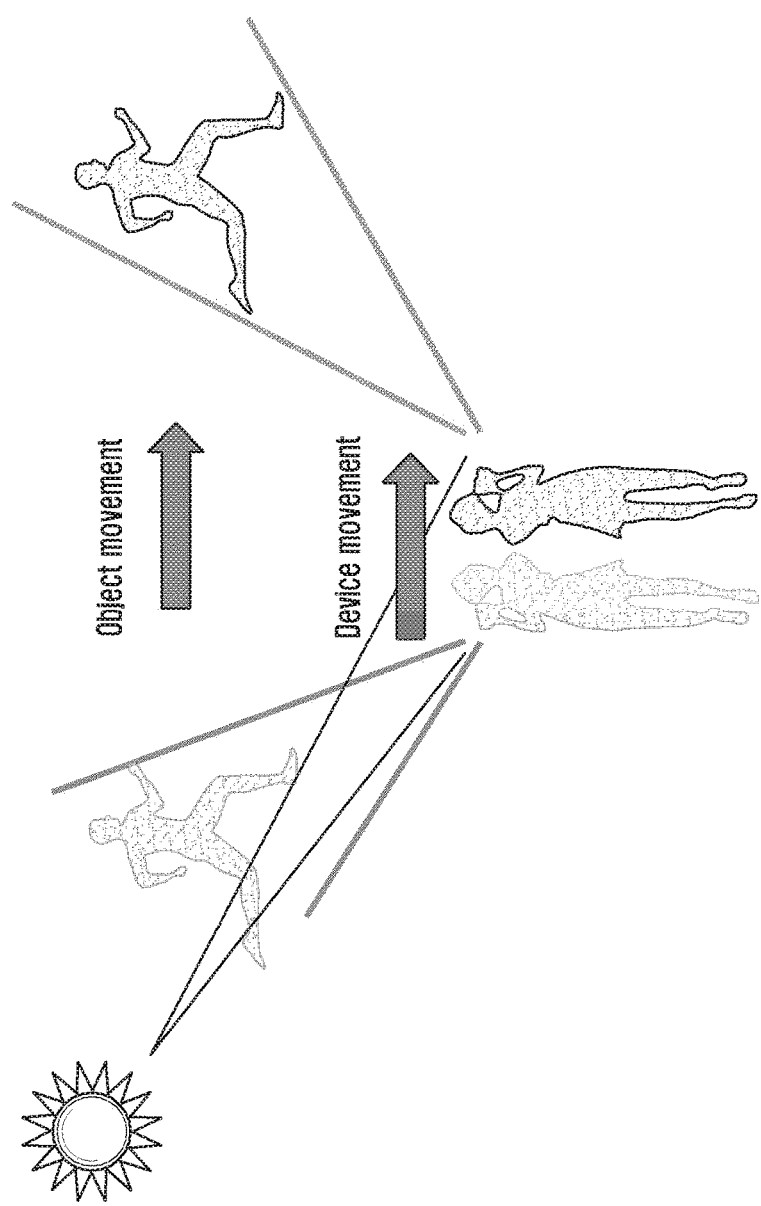
FIG. 12 illustrates a change of a partial area to correspond to the movement of an object contained in the image and an electronic device, according to various embodiments of the present disclosure.

FIG. 12 illustrates a change of a partial area to correspond to the movement of an object contained in the image and the electronic device 101, according to various embodiments of the present disclosure.

Referring to FIG. 12, the electronic device 101, according to an embodiment of the present disclosure, may compare movement information of the electronic device 101 with movement information of the object. The electronic device 101 may determine whether or not to change the partial area based on the comparison result.

The processor 400, according to an embodiment of the present disclosure, may not change the partial area if movement-related data (e.g., the movement direction or the moving speed compared to a distance) of the object is similar to the movement-related data of the electronic device 101. For example, if the object moves to the right and the electronic device 101 also moves to the right, the electronic device 101 may determine that the movement information is similar to each other. In another example, the electronic device 101 may determine whether or not the speed of the object compared to the moving distance thereof is similar to the speed of the electronic device 101 compared to the moving distance thereof.

The electronic device 101, according to an embodiment of the present disclosure, may change the partial area when the movement-related data of the object is not similar to the movement-related data of the electronic device 101. For example, when the electronic device 101 moves to the right and the object moves to the left, the electronic device 101 may make a control to reconfigure another object among the objects displayed on the screen to be a partial area.

Figure 13:
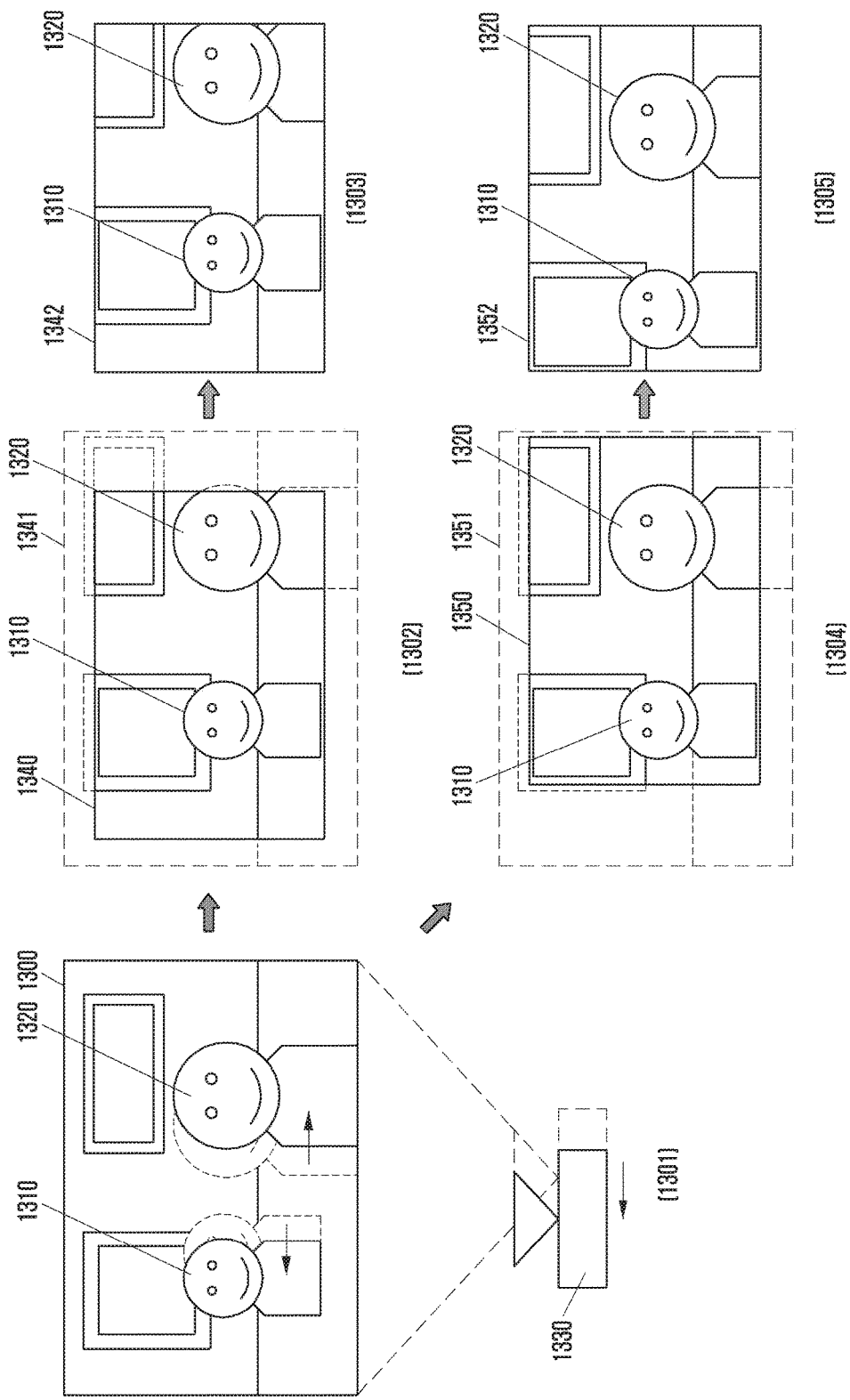
FIG. 13 illustrates a change of a partial area to correspond to the movement of an object contained in the image and an electronic device, according to various embodiments of the present disclosure.

FIG. 13 illustrates a change of a partial area to correspond to the movement of an object contained in the image and the electronic device 101, according to various embodiments of the present disclosure.

The electronic device 101, according to an embodiment of the present disclosure, may obtain images, and may display the images through the display.

Referring to diagram 1301 in FIG. 13, the imaging device 1330 may display the screen 1300 that includes the first object 1310 and the second object 1320. The screen 1300 may be displayed in the state in which a partial area is configured in the second object 1320. The objects 1310 and 1320 and the imaging device 1330 may move while displaying the screen 1300. For example, the imaging device 1330 may move to the left, the first object 1310 may move to the left, and the second object 1320 may move to the right.

Referring to diagram 1302 in FIG. 13, the electronic device 101 may compare the movement directions of the objects 1310 and 1320 with the movement direction of the imaging device 1330. Since it is determined that the movement direction of the first object 1310 is similar to the movement direction of the imaging device 1330, the electronic device 101 may change the partial area configured in the second object 1320 to a partial area 1341 based on the first object 1310. Referring to diagram 1303, the electronic device 101 may configure the partial area based on the first object 1310, and may display the result screen in which the image has been adjusted through a display.

Referring to diagram 1304 in FIG. 13, the electronic device 101 may not change the partial area 1351 configured in the second object 1320. For example, when an input event for fixing the partial area to the second object 1320 is detected, or when the moving speed of the first object 1310 is equal to, or more than, a predetermined reference moving speed value, the electronic device 101 may not change the partial area configured in the second object 1320. Referring to diagram 1305 in FIG. 13, the electronic device 101 may display, or store, the image based on the partial area 1351 of the second object, which has not been changed.

The electronic device 101, according to an embodiment of the present disclosure, may increase the size of the result screen 1342 or 1352 based on the partial area to the size of the original image 1340 or 1350.

Figure 14:
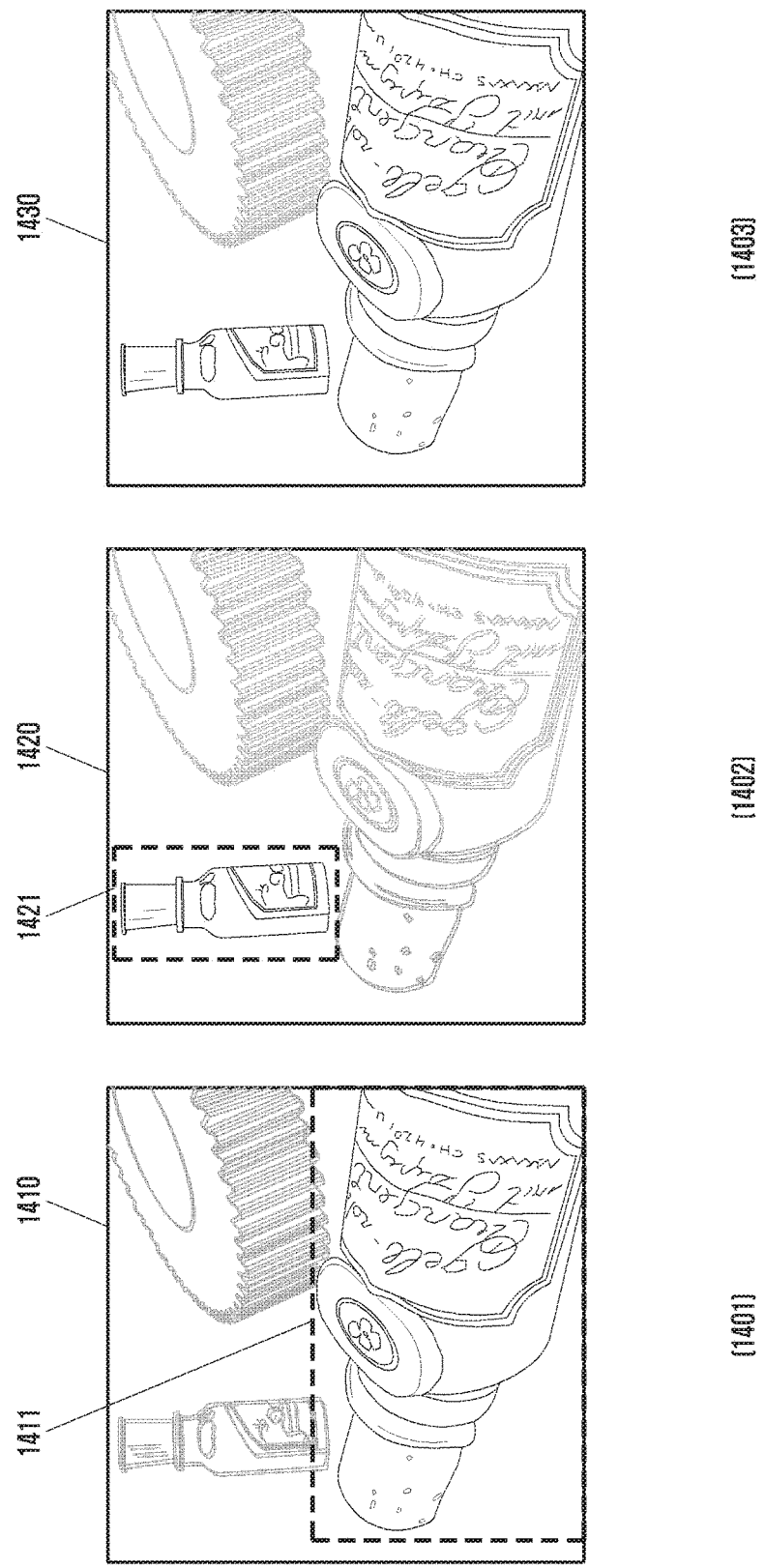
FIG. 14 illustrates synthesization of the partial areas of a plurality of images, according to various embodiments of the present disclosure.

FIG. 14 illustrates the synthesization of the partial areas of a plurality of images, according to various embodiments of the present disclosure.

The imaging device, according to an embodiment of the present disclosure, may photograph a plurality of images at different positions. A partial area may be configured in each of the objects that are contained in the photographed images.

Referring to diagram 1401 in FIG. 14, the electronic device 101 may display the first screen 1410 that includes a plurality of objects. The electronic device 101 may configure the first object 1411 of the first screen 1410, which is displayed, as a partial area.

Referring to diagram 1402 in FIG. 14, the electronic device 101 may display the second screen 1420 that includes a plurality of objects. The electronic device 101 may configure the second object 1421 of the second screen 1420 as a partial area.

Referring to diagram 1403 in FIG. 14, the electronic device 101 may display a result screen 1430 that is obtained by synthesizing the partial area of the first object 1411 and the partial area of the second object 1421. The electronic device 101, according to an embodiment of the present disclosure, may compensate for the difference of the position between the first screen 1410 and the second screen 1420, which are synthesized, by photographing the same in different positions by using a plurality of imaging devices. The electronic device 101, according to an embodiment of the present disclosure, may perform the compensation in consideration of a loss area of the corresponding frame in the adjacent frame that is photographed by the movement of the imaging device or the object.

Figure 15:
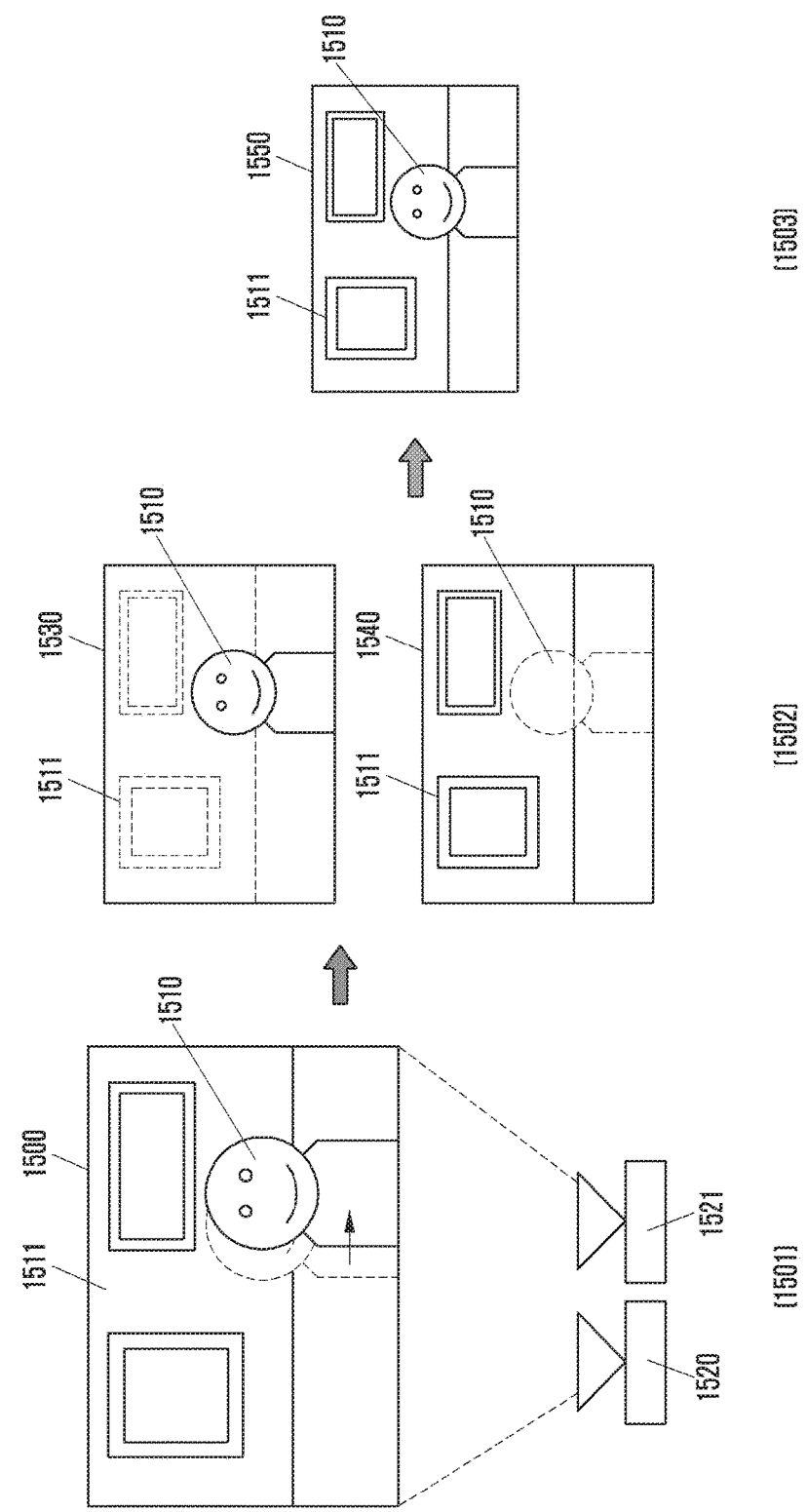
FIG. 15 illustrates the synthesization of the partial areas of a plurality of imaging devices, according to various embodiments of the present disclosure.

FIG. 15 illustrates the synthesization of the partial areas of a plurality of imaging devices, according to various embodiments of the present disclosure.

The electronic device 101, according to an embodiment of the present disclosure, may adopt a plurality of imaging devices. The electronic device 101 may obtain images based on a plurality of imaging devices provided.

Referring to diagram 1501 in FIG. 15, the electronic device 101 may display the screen 1500 that includes the first object 1510 and the second object 1511 through the imaging devices 1520 and 1521. Here, the first object 1510 may be a person, and the second object 1511 may be a background or may be an image object for a thing. The electronic device 101, according to an embodiment of the present disclosure, may display the image according to the movement of the first object 1510.

Referring to diagram 1502 in FIG. 15, the electronic device 101 may configure a partial area in the first object 1510 among the screen 1530 that is obtained by the first imaging device 1520. The electronic device 101 may configure a partial area in the second object 1511 among the screen 1540 that is obtained by the second imaging device 1521.

Referring to diagram 1503 in FIG. 15, the electronic device 101 may synthesize the partial area configured in the first object 1510 and the partial area configured in the second object 1511. The electronic device 101 may display the result image 1550 based on the synthesized partial area on the screen.

Figure 16:
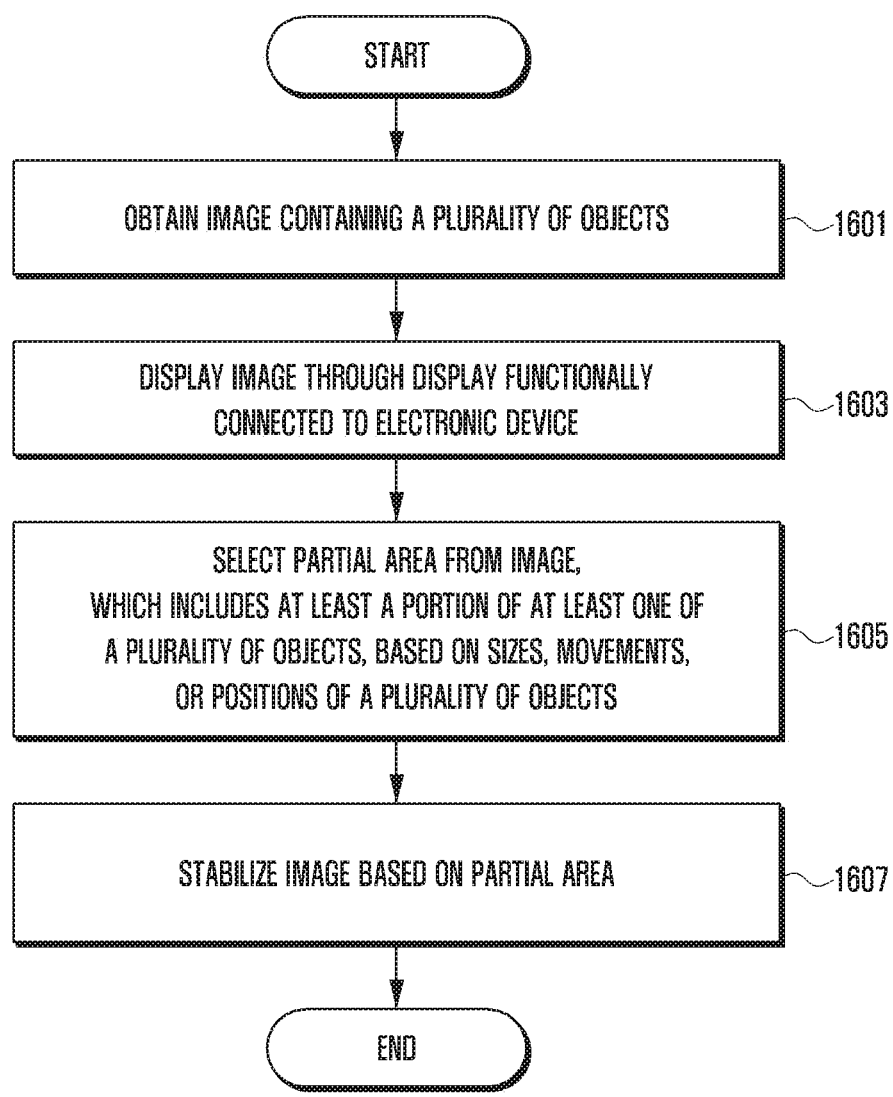
FIG. 16 is a flowchart for selecting a partial area of the image, according to various embodiments of the present disclosure.

FIG. 16 is a flowchart for selecting a partial area of the image, according to various embodiments of the present disclosure.

Referring to FIG. 16, in operation 1601, the electronic device 101 (e.g., the imaging device 410) may obtain an image that includes a plurality of objects. The electronic device 101, according to an embodiment of the present disclosure, may obtain the image based on image data that is stored in the memory 420 of the electronic device 101, image data that is obtained from another electronic device, or image data that is obtained by the camera module 291 of the electronic device 101. For example, the processor 400 may obtain the image data from another electronic device through a streaming method. In operation 1603, the electronic device 101 (e.g., the processor 400) may display the image through the display 430 that is functionally connected to the electronic device.

In operation 1605, the electronic device 101 (e.g., the image analyzing module 401) may select a partial area from the image, which includes at least a portion of at least one of a plurality of objects, based on the sizes, movements, or positions of a plurality of objects. In operation 1607, the electronic device 101 (e.g., the image stabilization module 404) may stabilize the image based on the partial area. The electronic device 101 (e.g., the processor 400) may be configured to designate the partial area of the image based on distance information between the object contained in the image and the electronic device, disparity information that is obtained from the electronic device 101, distance information between a plurality of objects contained in the image, size difference information between a plurality of objects contained in the image, information on at least one object that is contained in the designated range from the electronic device 101, designated object information, or a combination thereof.

The electronic device (e.g., the processor 400), according to an embodiment of the present disclosure, may determine the distance information between the object and the electronic device 101 based on metadata that is contained in the image.

In the case where the image contains a plurality of objects, the electronic device 101, according to an embodiment of the present disclosure, may configure partial areas of the plurality of objects with different weight values.

The electronic device 101, according to an embodiment of the present disclosure, may detect an input event for selecting a particular area of the displayed image through the display 430.

The electronic device 101 (e.g., the processor 400), according to an embodiment of the present disclosure, may configure the image corresponding to the detected input event as a partial area. When an input event for selecting a single face object, a plurality of face objects, a thing object, or a background object from the image displayed through the display 430 is detected, the electronic device 101 (e.g., the processor 400) may be configured to designate the image corresponding to the detected input event as a partial area of the image.

The electronic device 101 (e.g., the processor 400), according to an embodiment of the present disclosure, may display stabilized image through the display 430. The electronic device 101 (e.g., the processor 400), according to an embodiment of the present disclosure, may store the stabilized image in the memory 420.

Figure 17:
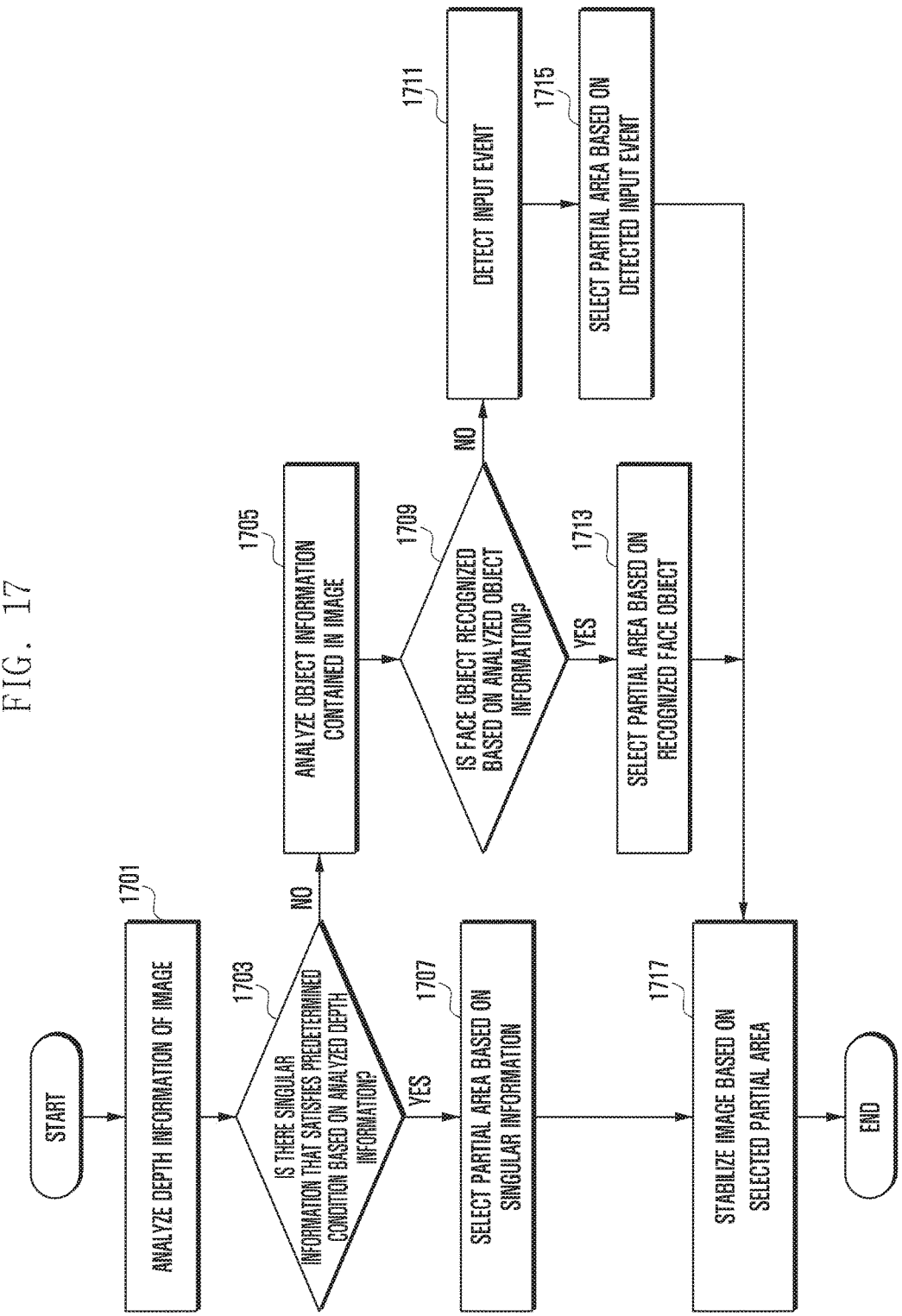
FIG. 17 is a flowchart for selecting a partial area of the image, according to various embodiments of the present disclosure.

FIG. 17 is a flowchart for selecting a partial area of the image, according to various embodiments of the present disclosure.

Referring to FIG. 17, in operation 1701, the electronic device 101 (e.g., the depth information extracting module 403) may analyze depth information of the image. Here, the depth information of the image may contain at least one piece of: distance information between the electronic device 101 and an object; or disparity information (a disparity value) that is obtained from the electronic device 101.

In operation 1703, the electronic device 101 (e.g., the depth information extracting module 403) may determine whether or not singular information exists, which satisfies a predetermined condition based on the depth information, which has been analyzed. The electronic device 101 (e.g., the depth information extracting module 403) may implement the depth map corresponding to the image. Here, the predetermined condition may be the ratio of the object in the image to the full screen, a moving speed reference value of the object, or the like.

If there is singular information that satisfies a predetermined condition, the electronic device 101 (e.g., the processor 400) may select a partial area based on the singular information in operation 1707. For example, if the first object is closest to the electronic device 101, the electronic device 101 (e.g., the processor 400) may select the first object as a partial area.

If there is no singular information that satisfies a predetermined condition, the electronic device 101 (e.g., image analysing device 402) may analyze the object information that is contained in the image in operation 1705. The electronic device 101 (e.g., image analysing device 402) may determine whether or not a face object is recognized based on the analyzed object information in operation 1709.

As illustrated in FIG. 17, if the face object is not recognized, the electronic device 101 may detect a user's input event through the display 430 in operation 1711. For example, the electronic device 101 may detect an input event of the user with respect to an area displayed in the image through the display 430. The electronic device 101 (e.g., the processor 400) may select a partial area based on the detected input event of the user in operation 1715. When an input event for selecting a single face object, a plurality of face objects, a thing object, or a background object from the image displayed through the display 430 is detected, the electronic device 101, according to an embodiment of the present disclosure, may select the area corresponding to the detected input event as a partial area of the image.

If the face object is recognized, the electronic device 101 may select a partial area based on the recognized face object in operation 1713.

The electronic device 101 (e.g., the image stabilization module 404) may stabilize the image based on the selected partial area in operation 1717.

Figure 18:
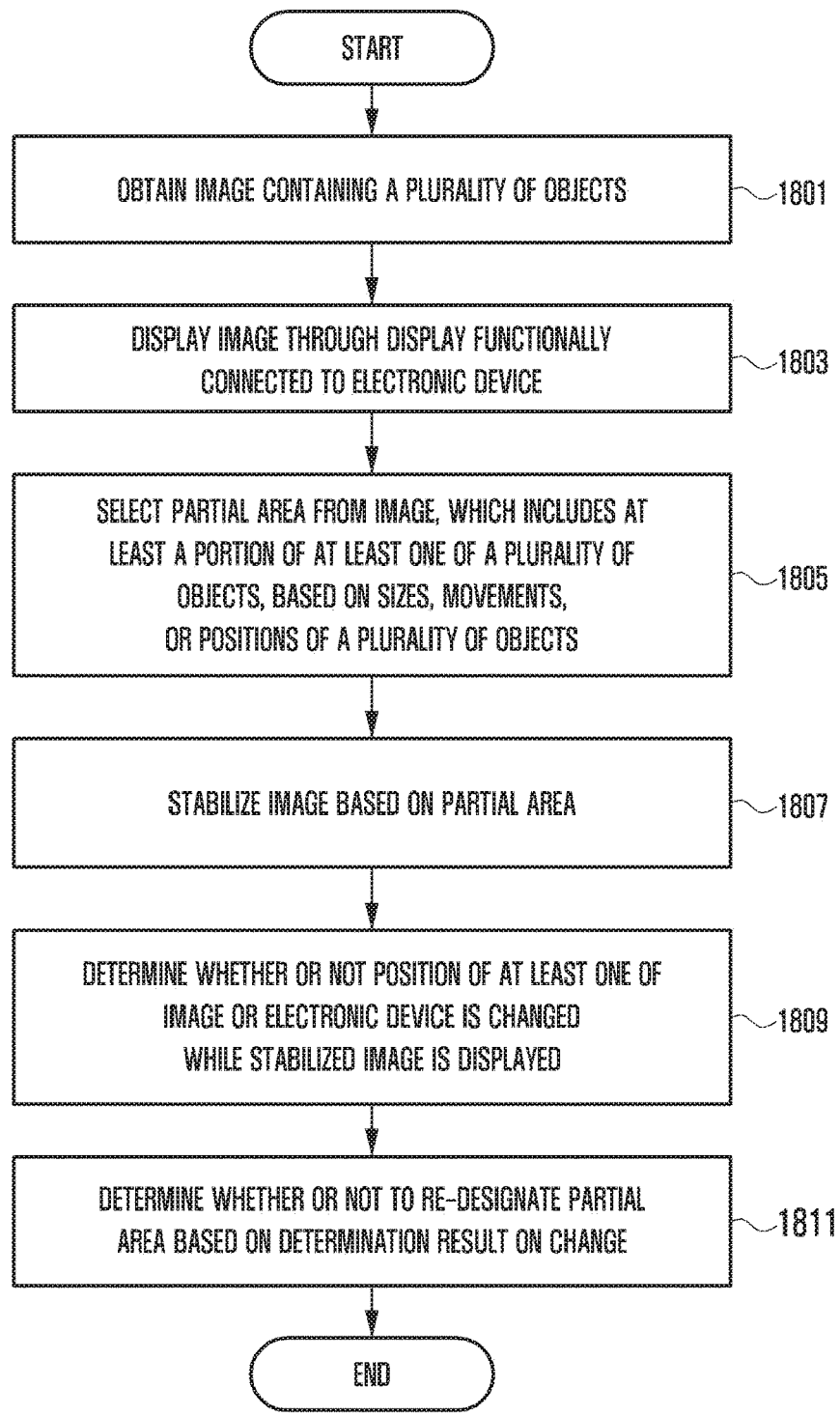
FIG. 18 is a flowchart for changing a partial area of the image, according to various embodiments of the present disclosure.

FIG. 18 is a flowchart for changing a partial area of the image, according to various embodiments of the present disclosure.

Referring to FIG. 18, in operation 1801, the electronic device 101 (e.g., the imaging device 410) may obtain an image that includes a plurality of objects. In operation 1803, the electronic device 101 (e.g., the processor 400) may display the image through the display 430 that is functionally connected to the electronic device.

In operation 1805, the electronic device 101 (e.g., the image analyzing module 401) may select a partial area from the image, which includes at least a portion of at least one of a plurality of objects, based on the sizes, movements, or positions of a plurality of objects. In operation 1807, the electronic device 101 (e.g., the image stabilization module 404) may stabilize the image based on the partial area.

In operation 1809, the electronic device 101 (e.g., the processor 400) may determine whether or not the position of at least one of the image or the electronic device is changed while the stabilized image is displayed.

In operation 1811, as illustrated in FIG. 18, the electronic device 101 (e.g., the processor 400) may determine whether or not to re-designate the partial area based on the determination result on the change. When the partial area is re-designated, the electronic device 101 (e.g., the image stabilization module 404), according to an embodiment of the present disclosure, may perform the image stabilization function again based on the re-designated partial area. The electronic device 101 (e.g., the processor 400), according to an embodiment of the present disclosure, may display the re-executed image on the screen through the display 430, or may store the same in the memory 420.

The electronic device 101 (e.g., the processor 400), according to an embodiment of the present disclosure, may determine whether or not to change the partial area based on at least one piece of: size information of an object contained in the image compared to the screen; moving speed information of an object displayed on the screen; movement information of an object displayed on the screen; distance information between an object displayed on the screen and the electronic device; movement comparison information that is obtained by comparing movement information of an object with movement information of the electronic device 101; or view related information in which an object can be displayed on the screen.

Figure 19:
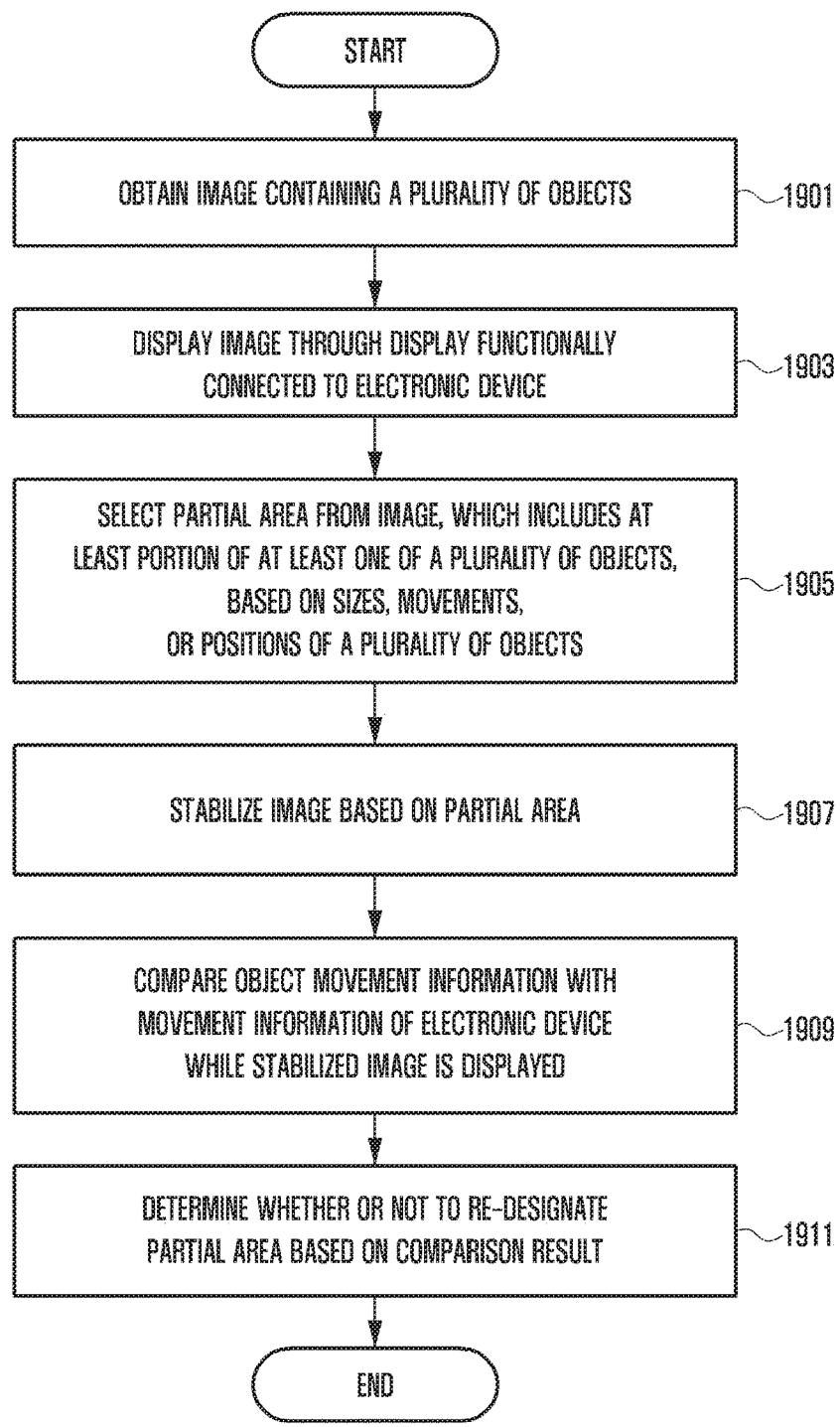
FIG. 19 is a flowchart for changing a partial area of the image, according to various embodiments of the present disclosure.

FIG. 19 is a flowchart for changing a partial area of the image, according to various embodiments of the present disclosure.

Referring to FIG. 19, in operation 1901, the electronic device 101 (e.g., the imaging device 410) may obtain an image that includes a plurality of objects. In operation 1903, the electronic device 101 (e.g., the processor 400) may display the image through the display 430 that is functionally connected to the electronic device.

In operation 1905, the electronic device 101 (e.g., the image analyzing module 401) may select a partial area from the image, which includes at least a portion of at least one of a plurality of objects, based on the sizes, movements, or positions of a plurality of objects. In operation 1907, the electronic device 101 (e.g., the image stabilization module 404) may stabilize the image based on the partial area. The electronic device 101 (e.g., the processor 400) may compare movement information of the object with movement information of the electronic device 101 while the stabilized image is displayed in operation 1909.

In operation 1911, as illustrated in FIG. 19, the electronic device 101 (e.g., the processor 400) may determine whether or not to re-designate the partial area based on the comparison result. When the partial area is re-designated, the electronic device 101 (e.g., the image stabilization module 404), according to an embodiment of the present disclosure, may perform the image stabilization function again based on the re-designated partial area. The electronic device 101 (e.g., the processor 400), according to an embodiment of the present disclosure, may display the re-executed image on the screen through the display 430, or may store the same in the memory 420.

FIG. 20 is a flowchart for synthesizing partial areas included in a plurality of images, according to various embodiments of the present disclosure.

Referring to FIG. 20, in operation 2001, the electronic device 101 (e.g., the imaging device 410) may obtain an image that includes a plurality of objects. In operation 2003, the electronic device 101 (e.g., the processor 400) may display the image through the display 430 that is functionally connected to the electronic device.

In operation 2005, the electronic device 101 (e.g., the image analyzing module 401) may select a partial area from the image, which includes at least a portion of at least one of a plurality of objects, based on the sizes, movements, or positions of a plurality of objects. In operation 2007, the electronic device 101 (e.g., the image stabilization module 404) may stabilize the image based on the partial area. The electronic device 101 (e.g., the imaging device 410) may obtain the second image that contains a plurality of objects in operation 2009.

The electronic device 101 (e.g., the processor 400) may select a partial area that includes at least a portion of at least one of a plurality of objects, which are contained in the second obtained image in operation 2011.

In operation 2013, the electronic device 101 (e.g., the image stabilization module 404) may stabilize the second image based on the selected partial area. In operation 2015, the electronic device 101 (e.g., the processor 400) may synthesize and adjust the stabilized image and the second image. The processor 400, according to an embodiment of the present disclosure, may display the synthesized and adjusted image on the screen through the display 430, or may store the same in the memory 420.

According to an embodiment of the present disclosure, the electronic device (illustrated in FIG. 1) may adopt a plurality of imaging devices. In the case where the electronic device 101 (e.g., the processor 400), according to an embodiment of the present disclosure, adopts a plurality of imaging devices, the electronic device 101 may select the first partial area that includes at least a portion of at least one of a plurality of objects that are contained in the first image obtained through the first imaging device of a plurality of imaging devices. The electronic device 101 (e.g., the processor 400), according to an embodiment of the present disclosure, may select the second partial area that includes at least a portion of at least one of a plurality of objects that are contained in the second image obtained through the second imaging device of a plurality of imaging devices. The electronic device 101 (e.g., the processor 400), according to an embodiment of the present disclosure, may synthesize and adjust the first image and the second image based on the first partial area and the second partial area. The electronic device 101 (e.g., the processor 400), according to an embodiment of the present disclosure, may display the synthesized and adjusted image on the screen through the display 430, or may store the same in the memory 420.

According to an embodiment of the present disclosure, if the first image and the second image contain the same object, the first partial area and the second partial area may be different from each other.

An electronic device 101, according to an embodiment of the present disclosure, may perform at least one of the operations of: obtaining an image that contains a plurality of objects; displaying the image through a display that is functionally connected to the electronic device; selecting a partial area from the image, which includes at least a portion of at least one of the plurality of objects, based on the sizes, movements, or positions of the plurality of objects; stabilizing the image based on the partial area; obtaining an image based on image data that is stored in a memory of the electronic device, image data that is obtained from another electronic device, or image data that is obtained by the camera module of the electronic device; selecting the partial area of the image based on based on distance information between the object contained in the image and the electronic device, disparity information that is obtained from the electronic device, distance information between a plurality of objects contained in the image, size difference information between a plurality of objects contained in the image, information on at least one object that is contained in the designated range from the electronic device, designated object information, or a combination thereof; determining the distance information between the object and the electronic device based on metadata contained in the image; detecting an input event for selecting a particular area in the displayed image; configuring an area corresponding to the detected input event as the partial area of the image; detecting an input event for selecting a single face object in the displayed image; detecting an input event for selecting a plurality of face objects in the displayed image; detecting an input event for selecting a thing object in the displayed image; detecting an input event for selecting a background object in the displayed image; displaying the stabilized image through the display; storing the stabilized image in a storage unit; determining whether or not the position of at least one of the image or the electronic device is changed while the stabilized image is displayed; determining whether or not to re-designate the partial area based on the determination result of the change; obtaining the second image that contains a plurality of objects by using a camera module; selecting a partial area that includes at least a portion of at least one of the plurality of objects that are contained in the second obtained image; stabilizing the second image based on the select partial area; or synthesizing and adjusting the stabilized image and the second stabilized image.

According to an embodiment of the present disclosure, a computer-readable recording medium may record a program that stores instructions that allow a processor to: obtain an image that contains a plurality of objects; display the image through a display that is functionally connected to the electronic device; select a partial area from the image, which includes at least a portion of at least one of the plurality of objects, based on the sizes, movements, or positions of the plurality of objects; and stabilize the image based on the partial area. For instance, the computer readable-recording medium may record program(s) related to various flowcharts disclosed in the present disclosure, such as in FIGS. 16-20

The above-discussed method is described herein with reference to flowchart illustrations of user interfaces, methods, and computer program products according to embodiments of the present disclosure. It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which are executed via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that are executed on the computer or other programmable apparatus provide steps for implementing the functions specified in the flowchart block or blocks.

And each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

While this disclosure has been particularly shown and described with reference to an example embodiment thereof, it will be understood by those skilled in the art that various changes in form and details may be made therein without departing from this disclosure as defined by the appended claims.

The above-described embodiments of the present disclosure can be implemented in hardware, firmware or via the execution of software or computer code that can be stored in a recording medium such as a compact-disc ROM (CD ROM), a DVD, a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

The control unit may include a microprocessor or any suitable type of processing circuitry, such as one or more general-purpose processors (e.g., ARM-based processors), a digital signal processor (DSP), a programmable logic device (PLD), an application-specific integrated circuit (ASIC), a FPGA, a GPU, a video card controller, etc. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for". In addition, an artisan skilled in the art understands and appreciates that a "processor" or "microprocessor" may be hardware in the claimed disclosure. While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
   at least one camera; and
   a processor configured to:
      collect, via the at least one camera, a first image including a plurality of objects,
      display the first image through a display that is functionally connected to the processor,
      select a first partial area of the first image, which includes at least a portion of at least one of the plurality of objects, based on at least one of distance information between the plurality of objects included in the first image and the electronic device, disparity information that is obtained from the electronic device, or distance information between the plurality of objects included in the first image,
      stabilize the first image based on the selected first partial area,
      collect, via the at least one camera, a second image including the plurality of objects,
      select a second partial area of the second image and stabilize the second image based on the second partial area, and
      synthesize the stabilized first image and the stabilized second image.

2. The device according to claim 1, wherein the processor is further configured to:
   determine whether or not a face object is recognized on the first image by the processor, based on at least one of the distance information between the plurality of objects included in the first image and the electronic device, the disparity information, or the distance information between the plurality of objects included in the first image,
   if the face object is not recognized on the first image by the processor, detect a user input event on the first image displayed through the display, and
   determine the first partial area of the first image based on the detected user input event.

3. The device according to claim 2, wherein the detecting of the user input event comprises at least one of:
   detecting an input event for selecting a single face object in the displayed first image;
   detecting an input event for selecting a plurality of face objects in the displayed first image;
   detecting an input event for selecting a thing object in the displayed first image; or
   detecting an input event for selecting a background object in the displayed first image.

4. The device according to claim 1, wherein the processor is further configured to:
   display the synthesized image through the display, or
   store the synthesized image in a storage unit.

5. The device according to claim 1, wherein the processor is further configured to:
   determine whether or not the first image is changed based on at least one of:
      size information of an object among the plurality of objects included in the first image compared to the display;
      moving speed information of an object among the plurality of objects displayed on the display;
      movement information of an object among the plurality of objects displayed on the display;
      distance information between an object among the plurality of objects displayed on the display and the electronic device;
      movement comparison information that is obtained by comparing movement information of an object among the plurality of objects with movement information of the electronic device; or
      view related information in which an object among the plurality of objects can be displayed on the display; and
   collect the second image including the plurality of objects in response to the first image being changed.

6. The device according to claim 1, wherein, in the case where the electronic device adopts a plurality of imaging devices, the processor is further configured to:
   select the first partial area that includes at least a portion of at least one of a plurality of objects that are included in the first image that is obtained through a first imaging device among the plurality of imaging devices,
   select the second partial area that includes at least a portion of at least one of a plurality of objects that are included in the second image that is obtained through a second imaging device among the plurality of imaging devices, and
   synthesize and adjust the first image and the second image based on the first partial area and the second partial area.

7. The device according to claim 6, wherein the first image and the second image include the same object.

8. A method for providing an image in an electronic device, the method comprising:
   collecting a first image including a plurality of objects;
   displaying the first image through a display that is functionally connected to the electronic device;
   selecting a first partial area of the first image, which includes at least a portion of at least one of the plurality of objects, based on at least one of distance information between the plurality of objects included in the first image and the electronic device, disparity information that is obtained from the electronic device, or distance information between the plurality of objects included in the first image;

stabilizing the first image based on the selected first partial area;

collecting a second image including the plurality of objects;

selecting a second partial area of the second image and stabilizing the second image based on the second partial area; and synthesizing the stabilized first image and the stabilized second image.

9. The method according to claim 8, wherein the collecting of the first image and the second image comprises:

obtaining an image based on image data that is stored in a memory of the electronic device, obtaining image data from another electronic device, or obtaining image data by at least one camera of the electronic device.

10. The method according to claim 8, wherein the selecting of the first partial area of the first image based on the distance information between the plurality of objects included in the first image and the electronic device comprises:

determining the distance information between the plurality of objects included in the first image and the electronic device based on metadata included in the first image.

11. The method according to claim 8, wherein the selecting of the first partial area comprises:

determining whether or not a face object is recognized on the first image, based on at least one of the distance information between the plurality of objects included in the first image and the electronic device, the disparity information, or the distance information between the plurality of objects included in the first image;

if the face object is not recognized on the first image, detecting a user input event on the displayed first image; and determining the first partial area of the first image based on the detected user input event.

12. The method according to claim 11, wherein the detecting of the user input event comprises at least one of:

detecting an input event for selecting a single face object in the displayed first image;

detecting an input event for selecting a plurality of face objects in the displayed first image;

detecting an input event for selecting a thing object in the displayed first image; or detecting an input event for selecting a background object in the displayed first image.

13. The method according to claim 8, further comprising at least one of:

displaying the synthesized image through the display; or storing the synthesized image in a storage unit.

14. A non-transitory computer-readable storage medium storing instructions that, when executed, cause at least one processor to:

collect a first image including a plurality of objects;

display the first image through a display that is functionally connected to the electronic device;

select a first partial area from the first image, which includes at least a portion of at least one of the plurality of objects, based on at least one of distance information between the plurality of objects included in the first image and the electronic device, disparity information that is obtained from the electronic device, or distance information between the plurality of objects included in the first image;

stabilize the first image based on the first partial area;

collect, via at least one camera, a second image including the plurality of objects;

select a second partial area of the second image and stabilize the second image based on the second partial area; and synthesize the stabilized first image and the stabilized second image.

* * * * *